(12) United States Patent
Wong

(10) Patent No.: US 6,659,862 B2
(45) Date of Patent: Dec. 9, 2003

(54) ELECTRONIC GAME APPARATUS FOR GUESSING ENGLISH ACRONYMS

(76) Inventor: Jacob Y. Wong, 7110 Georgetown Rd., Goleta, CA (US) 93117

( * ) Notice: Subject to any disclaimer, the term of this patent is extended or adjusted under 35 U.S.C. 154(b) by 217 days.

(21) Appl. No.: 09/911,501

(22) Filed: Jul. 25, 2001

(65) Prior Publication Data

US 2002/0107062 A1 Aug. 8, 2002

(30) Foreign Application Priority Data

Dec. 5, 2000 (CN) .................................... 00 1 34748 A

(51) Int. Cl.[7] .............................................. A63F 13/10
(52) U.S. Cl. ........................................................ 463/10
(58) Field of Search ................ 463/9, 10; 273/429–431

(56) References Cited

U.S. PATENT DOCUMENTS

| | | | |
|---|---|---|---|
| 3,524,648 A | 8/1970 | Nilan ...................... 273/153 R |
| 3,628,792 A | 12/1971 | Frederick et al. ........... 273/140 |
| 3,825,255 A | 7/1974 | Kennard et al. ............ 273/139 |
| 3,891,218 A | 6/1975 | Hilgartmer et al. ......... 273/272 |
| 3,948,526 A | 4/1976 | Lukacik ...................... 273/239 |
| 4,012,044 A | 3/1977 | Grossi ........................ 273/272 |
| 4,194,742 A | 3/1980 | Adams ........................ 273/265 |
| 4,251,078 A | 2/1981 | Meirovitz ................... 273/265 |
| 4,341,389 A | 7/1982 | Dumont ...................... 273/265 |
| 4,375,666 A | 3/1983 | Buck et al. .................... 463/10 |
| 4,565,373 A | 1/1986 | Ungar ......................... 273/265 |
| 4,685,672 A | 8/1987 | Fillers ........................ 273/459 |
| 4,733,863 A | 3/1988 | Novotny ..................... 273/429 |
| 4,811,953 A | 3/1989 | Jeng ........................... 273/265 |
| 5,338,043 A | 8/1994 | Rehm ......................... 273/272 |
| 5,359,780 A | 11/1994 | Dallaire ....................... 33/265 |
| 5,403,014 A * | 4/1995 | Anema et al. ............... 273/292 |
| 5,479,506 A | 12/1995 | Rehm ............................ 380/1 |
| 5,740,243 A | 4/1998 | Rehm ............................ 380/1 |

* cited by examiner

Primary Examiner—Andrew M. Dolinar
(74) Attorney, Agent, or Firm—Rabin & Berdo, P.C.

(57) ABSTRACT

An electronic game apparatus for guessing the English acronyms comprise a game console and a system processor. The game console includes an alphanumeric keyboard, a display, and an ON/OFF switch. The system processor includes a central processing unit, a read only memory for storing the system software for performing the acronym guess, a random access memory and an input/output interface. The system software for performing the acronym guess includes a start loop module for setting the playing chances and the players' turn for each player, and a main loop module for displaying the subject category to be guessed, the acronym puzzle and the game wheel, and for guessing the meaning of the acronym based on the word spellings relative to each letter in the acronym puzzle and the related prompt information which are set and displayed at each segment on the game wheel.

7 Claims, 20 Drawing Sheets

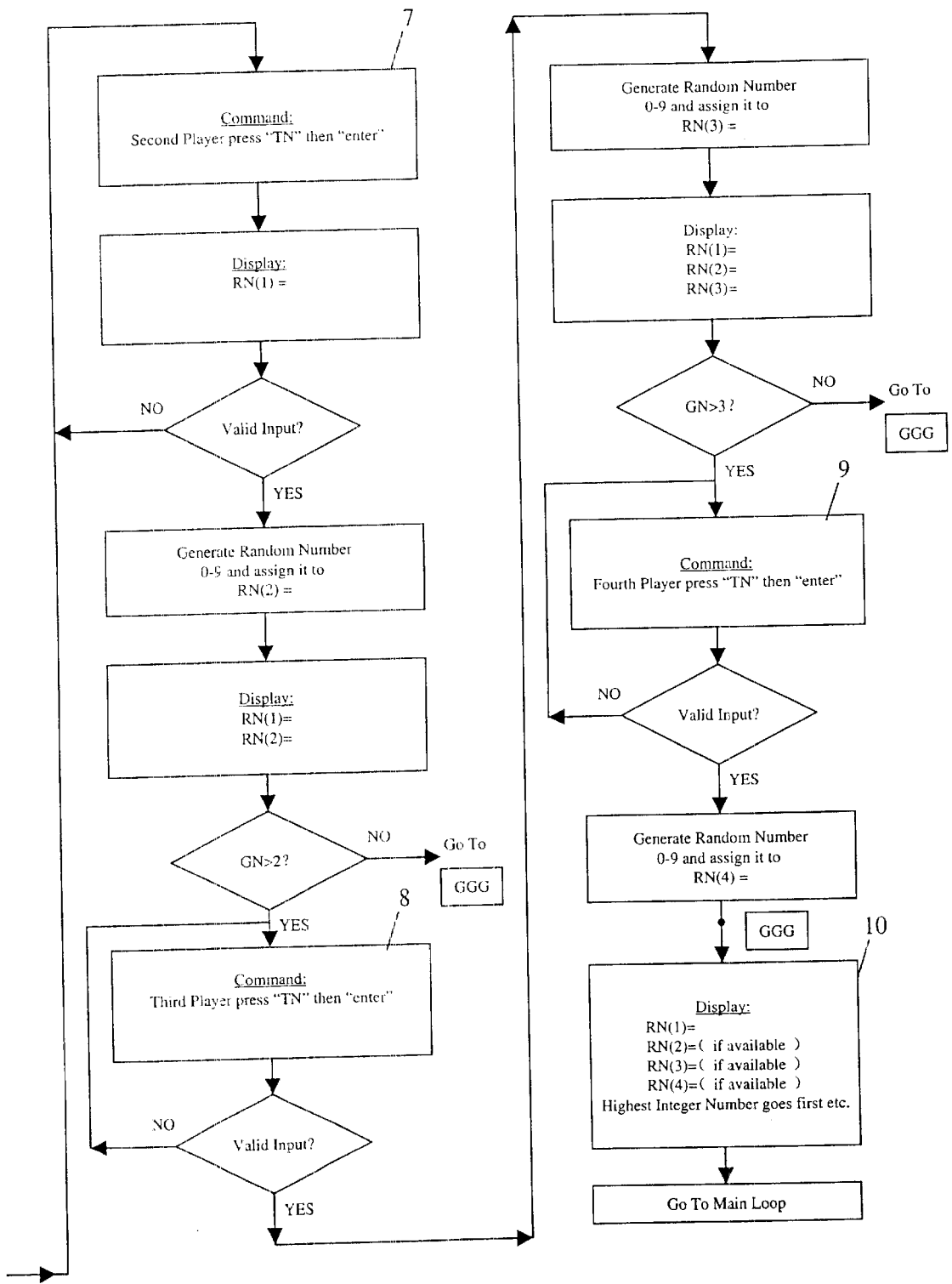
Figure 2B
Continued from Figure 2A

ELECTRONIC GAME APPARATUS FOR GUESSING ENGLISH ACRONYMS

FIELD OF THE INVENTION

The present invention relates to the field of electronic games. In particular, it relates to an electronic guessing game involving certain subtle characteristics inherent with the English language, viz. acronyms.

BACKGROUND

Over the past three decades, a host of intellectual mind games, primarily of the guessing types and both mechanically and electronically implemented, were advanced. The subjects of these games have to do with words of languages, numbers, cryptography, confectionery and mechanical pieces. A list of these games invented over the years is presented below as subject matter references:

U.S. Pat. No. 3,524,648 (1970) "Puzzle apparatus";
U.S. Pat. No. 3,628,792 (1971) "Game apparatus involving magnetized selection of game pieces";
U.S. Pat. No. 3,825,255 (1974) "Number guessing game device";
U.S. Pat. No. 3,891,218 (1975) "Decoding crossword-type game";
U.S. Pat. No. 3,948,526 (1976) "Game apparatus for a game of hangman";
U.S. Pat. No. 4,012,044 (1977) "Hangman game apparatus";
U.S. Pat. No. 4,194,742 (1980) "Land and sea war game apparatus";
U.S. Pat. No. 4,251,078 (1981) "Guessing game";
U.S. Pat. No. 4,341,389 (1982) "Word finding and guessing game";
U.S. Pat. No. 4,375,666 (1983) "Electronic game";
U.S. Pat. No. 4,565,373 (1986) "Numerical guessing game";
U.S. Pat. No. 4,685,672 (1987) "Guessing game and associated playing period";
U.S. Pat. No. 4,733,863 (1988) "Confectionery game";
U.S. Pat. No. 4,811,953 (1989) "Numbering guessing game structure";
U.S. Pat. No. 5,338,043 (1994) "Cryptographic guessing game";
U.S. Pat. No. 5,359,780 (1994) "Bow sight assembly";
U.S. Pat. No. 5,479,506 (1995) "Cryptographic guessing game";
U.S. Pat. No. 5,740,243 (1998) "Cryptographic guessing game".

In U.S. Pat. No. 4,341,389 issued to Dumond et al. in 1982 (listed above), the disclosure describes a game to be played by two players and which involves the guessing by one player of a word selected by the opposite player. By questions and answers, the player will try to locate the position occupied by the word to be guessed, opposite a particular column, after which he will try to identify each letter of the word to be guessed. In his turn, the opposite player will also try to arrive at guessing the word selected by the first player. While this game is an excellent tool to develop the vocabulary of a person, it is totally different from the present invention which is a guessing game about acronyms of the English language and not directly about the guessing of words.

As a matter of fact, the most popular games about words and languages over the past several decades have been the games of Scrabble and Wheel of Fortune. Both of these well-known language games are based upon and played around language words. For example, the game of Scrabble tests the players with their depth of knowledge about the words of the language. The players have to compose valid words (according to a standard dictionary) to score points using letters in their possession. On the other hand, players of Wheel of Fortune have to guess at letters in order to get to the words that compose and reveal the puzzle. Again both of these "words" games are different from the present invention which takes advantage of the subtle characteristics of the English language as expressed by its many acronyms.

According to the Webster's New Collegiate Dictionary, an acronym is a word (as "radar" or "snafu") formed from the initial letter or letters of each of the successive parts or major parts of a compound term. An acronym is not the same as abbreviation which is a shortened or contracted form of a word or phrase, used to represent the whole. The use of acronyms can be dated back a long way, at least in the English language. In the U.S., the use of acronyms appears to originate initially for simplifying the identification of certain public organizations such as associations or trade unions. The best example is the acronym "PTA" which stands for Parent-Teacher Association. No doubt many acronyms in the U.S. can probably be traced back even to before the early 1900's, however many acronyms started to appear in 1930's and 1940's. Examples are "UAW" which stands for United Automobile Workers and "AMA" which stands for American Medical Association and also for American Management Association. Even in the English language itself, acronyms sometimes also show up. One example is "TWIMC" which stands for To Whom It May Concern.

But the proliferation of acronym usage across the American society at large did not start in earnest until after the World War II. There are several reasons to account for this occurrence.

The most prominent is the continued growth of the population in peace time while the English language remains virtually unchanged, both in size and usage. By that we mean very few new English words have been added to the language from the period after World War II until today. Meanwhile more and more organizations and associations are being formed thereby creating the more acronym usage just for identification purposes. Examples are "UNESCO" which stands for United Nations Educational Scientific Cultural Organization and "NAACP" which stands for National Association for the Advancement of Colored People.

Another reason is the continued growth of scientific disciplines in society thereby springing many new professional associations which do not exist before. Examples are "DISA" which stands for Data Interchange Standards Association and "ACAA" which stands for Agricultural Conservation and Adjustment Administration. Still another reason is due to the Government agencies, particularly the Defense Department and the Pentagon. During the period prior to the recent end of the so-called "Cold War", a tremendous amount of research and development was earmarked for conventional and nuclear weaponry, space satellite communication and missile and rockets deployment. A host of acronyms quickly appeared on the scene, partly to conceal to some extent the nature and contents of many of the research projects from foreign nationals and average citizens and partly as jargons to impress the US Congress for project funding appropriations. The most familiar acronyms include "ICBM" which stands for Inter-Continental Ballistic Missiles, "SDI" which stands for Starwar Defense Initiative, "MSP" which stands for Mosaic Sensor Program and a host of others.

But by far the greatest reason why so many acronyms are in use in American society today is the advancement of science and technology during the past several decades. This ushers in many new industries including computer hardware and software, microelectronics or the microchip, medical instruments, pharmaceuticals and drugs, genetic engineering and finally the Internet and the World Wide Web. The advent of these new sciences and technologies literally impacts all aspects of the American society. One example is the electronic banking and commerce. As an example of the volumetric use of acronyms in this industry alone, over 200 of them are listed in Appendix I. There are many other industries like the electronic banking and commerce and they too have their equally large arsenal of acronyms widely in use today.

The widespread use of acronyms in just about every industry today has pretty much created artificial barriers or walls separating professionals, workers and the average citizen alike in different industrial disciplines. For example, a chemical engineer, accustomed to only reckoning acronyms or jargons in the chemical industry, has a hard time understanding a software engineer's acronyms used in the day to day transactions of the electronic banking and commerce industry. Because of this situation, the average citizen is getting harder and harder to understand the phrasing and terminology of many of society's fabrics which he has to interact and deal with on a daily basis. Unless something is done to counteract this unhealthy situation, many of the citizens in society will be by default becoming more and more isolated from one another. The progressive lack of mutual understanding among the citizenry of a society in their everyday life will in time become a threat to the peace and prosperity of the entire society itself.

It is an object of the present invention to provide an electronic game apparatus for guessing English language acronyms. The object is to attempt to educate the average citizen through this acronym guessing game by familiarizing him with the meaning of many acronyms used in all facets of the society wherein he lives. The presently invented acronym guessing game is easy to implement, simple to play and hopefully exciting and educational. Since no such a game is available today, it is the fervent hope of the inventor that the presently invented game will serve to fill a need in society at large.

SUMMARY

In accordance with the present invention, an electronic game apparatus for guessing the English acronyms comprise a game console and a system processor, wherein the said game console includes an alphanumeric keyboard to interface and input a command to the said system processor, a display interfaced to and controlled by the said system processor to display the status of the game, and an ON/OFF switch; the said system processor includes a central processing unit, a read only memory for storing the system software for performing the acronym guess, a random access memory and an input/output interface, wherein the said system software for performing the acronym guess includes a start loop module for setting the playing chances and the players' turn for each player, and a main loop module for displaying the subject category to be guessed, the acronym puzzle and the game wheel, and for guessing the meaning of the acronym based on the word spellings relative to each letter in the acronym puzzle and the related prompt information which are set and displayed at each segment on the game wheel.

In accordance with the present invention, an acronym game session is defined as a game playing period lasting typically, but not limited to, 30 minutes in length. An acronym puzzle game is defined as one of several to be played during a particular acronym game session. The number of acronym puzzle games actually played during a game session might vary dependent upon how long a particular acronym puzzle game is played by the players. Typically between 3 to 4 acronym puzzle games can be played during a game session lasting approximately 30 minutes.

Although the Acronym Guessing Game can be played by just about any number of players, it is generally best played by four players or less. If the number of players is more than four (4), then the game session is preferred to be elongated to more than 30 minutes dependent upon the actual number of players. As a rule of thumb, each player should be allocated a playing time of roughly 10 minutes per game session.

For every game session, there are six (6) subject categories specially assigned for players from which to select his/her puzzle, when his/her turn comes up to play for a particular acronym puzzle game. Associated with each of the six subject categories are three or more acronym puzzles to be guessed at and solved by the players. The players' turns to play during a game session are determined randomly ahead of time by the game apparatus before the session actually starts. When it is his/her turn to play, the player will first select a particular subject category. An acronym puzzle will then appear automatically for the players to solve during the ensuing puzzle game.

The first player then spins a wheel having 24 segments. All the 26 alphabet letters either singly or in small groups occupy a total of 18 segments. Two segments are allocated as "Wild Letter" and two as "Extra Clue". One of the remaining two segments is "Lose a turn" and the other "Bankrupt". As the name "Wild Letter" implies, when a player lands on this segment, he or she can pick any letter in the remaining acronym puzzle in order to fully spell out the word represented in the puzzle by that chosen letter. On the other hand, when the players lands on "Extra Clue", a clue will be displayed about the meaning or origin of the acronym puzzle in order to help the player to come up with the correct guess. Except for the two segments "Lose a turn" and "Bankrupt" whose meanings are obvious, each of the other 22 segments all carries a monetary value. In some special acronym puzzle games, the monetary value of some segments could be replaced by a special promotional gift item or a travel trip paid for by one of the Acronym Guessing Game advertisement sponsors.

The game continues after the first player's turn to spin the wheel. Dependent upon which of the segments is landed, the first player will start accumulate monetary value as shown in the wheel segment. Since the segment might also carry a letter (or a small group of letters), that matches one or more of those in the acronym puzzle, the word or words corresponding to one or more of the acronym puzzle letters will be fully spelled out if that is the case. If the segment contains no monetary value but a gift or a travel trip, the player will keep the gift or travel trip in lieu of the monetary value. After each spinning of the wheel, a player can take a guess at the acronym puzzle. If he guesses correctly at the puzzle, then that particular puzzle game will end and the winning player will collect all the monetary value accumulated during the game, plus any gifts or travel trips earned if applicable. The other players will forfeit their corresponding accumulated monetary values and/or the gift or travel items for the game that is ending. If the player guesses incorrectly, the game will continue with the next player waiting in turn to spin the wheel.

These steps will continue until one of the players finally guesses correctly at the acronym puzzle to end this particular game. After a puzzle game is ended and if there is enough time left in the game session, a new puzzle game will start with a new player in turn to select the subject category and spin the wheel. The above playing steps continue from player to player until the acronym puzzle is once again solved by one of the players at which point the puzzle game ends. If there is still time left in the game session to play another puzzle game, a new player other than the one that started the last puzzle game will now begin the game by spinning the wheel again. Otherwise the game session will come to an end. As was stated earlier, a typical 30 minutes session will accommodate the playing of 3 to 4 game puzzles.

BRIEF DESCRIPTION OF DRAWINGS

FIGS. 2A and 2B show the Start Loop sub-flow chart.

DETAILED DESCRIPTION OF THE PREFERRED EMBODIMENT

Figure 1:
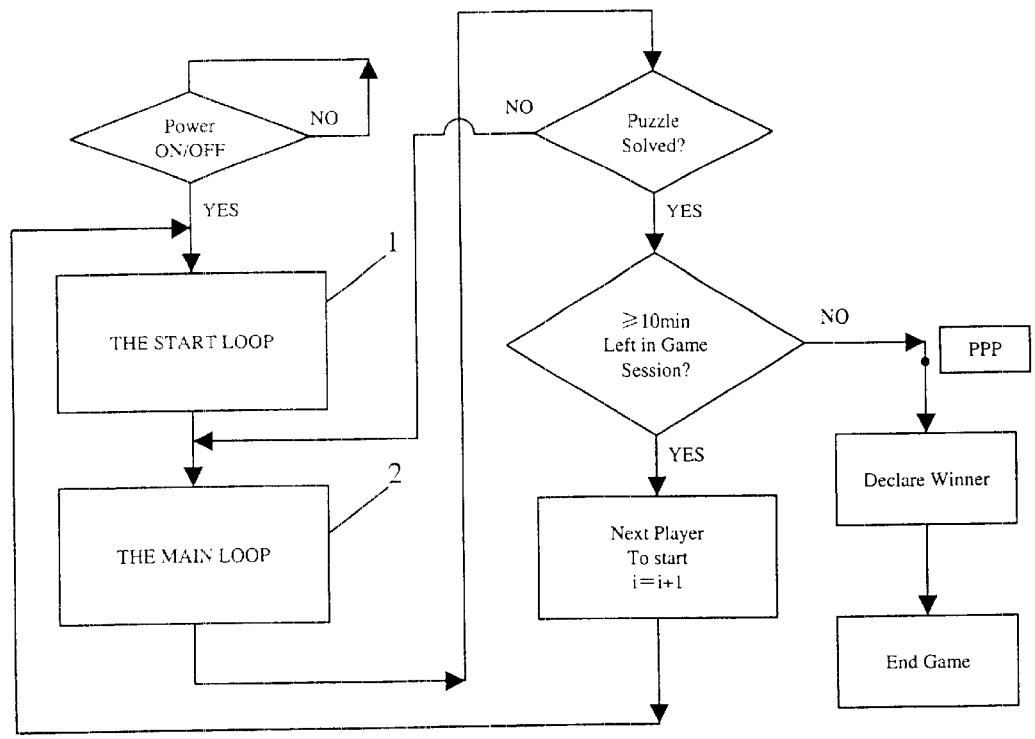
FIG. 1 shows the Acronym Guessing Game system flow chart.

FIG. 1 shows the acronym guessing game system flow chart. The start loop 1 takes over after the game apparatus is turned on. The main functions of this start loop 1 are 1) to determine using a single-integer-digit random number generator the playing turns for the players if the number of players is more than one but less than four; and 2) to select for the game session the six subject categories whence the acronyms from each subject category are derived. The start loop 1 is followed by the main loop 2. The main loop 2 contains all the playing elements of the game including 1) choice of subject category; 2) presentation of the acronym puzzle associated with the subject category selected; 3) game wheel spinning for monetary value determination and possible help for guessing at the puzzle and 4) guess at the puzzle itself. Every time a player successfully guesses at the acronym puzzle thus ending a puzzle game, the main loop 2 checks for the time remaining in the session and makes a determination whether to end the session or to start another puzzle game.

Figure 2A:
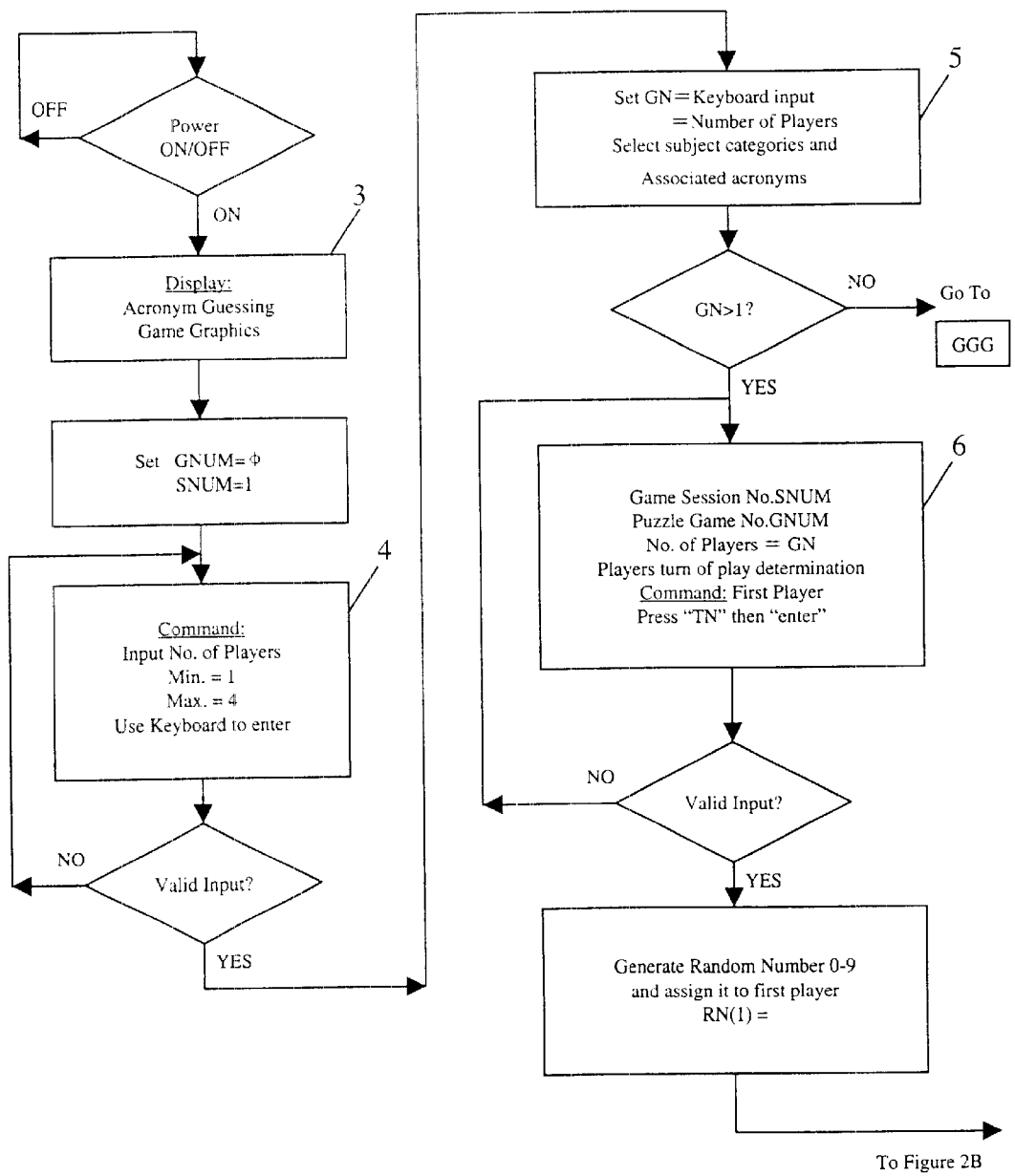

FIG. 2 shows the details of the start loop 1 sub-flow chart. After the game is turned on and the Acronym Guessing Game graphics are displayed in block 3, a representative of the players is requested to enter the number of players in block 4. After the six designated subject matters are selected internally by the game apparatus in block 5, each of the players takes turn to ask the game apparatus for a random number as depicted in blocks 6–9(see FIG. 2). Then based upon the ranking order of the single integer random numbers drawn by the respective players, the game apparatus enunciates the turn of play for the players in block 10.

Figure 3A:
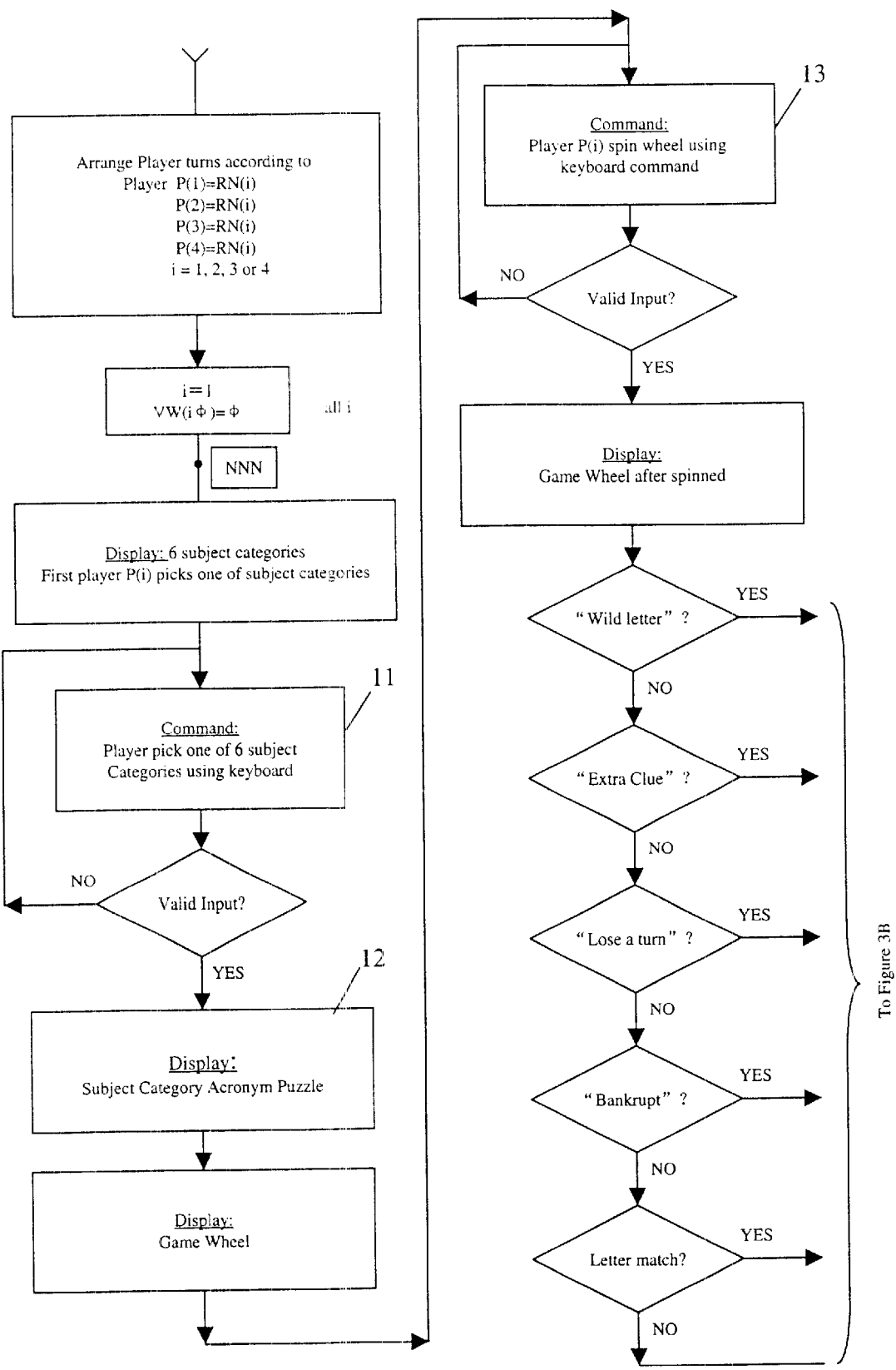
FIGS. 3A and 3B show the Main Loop sub-flow chart.
Figure 3B:
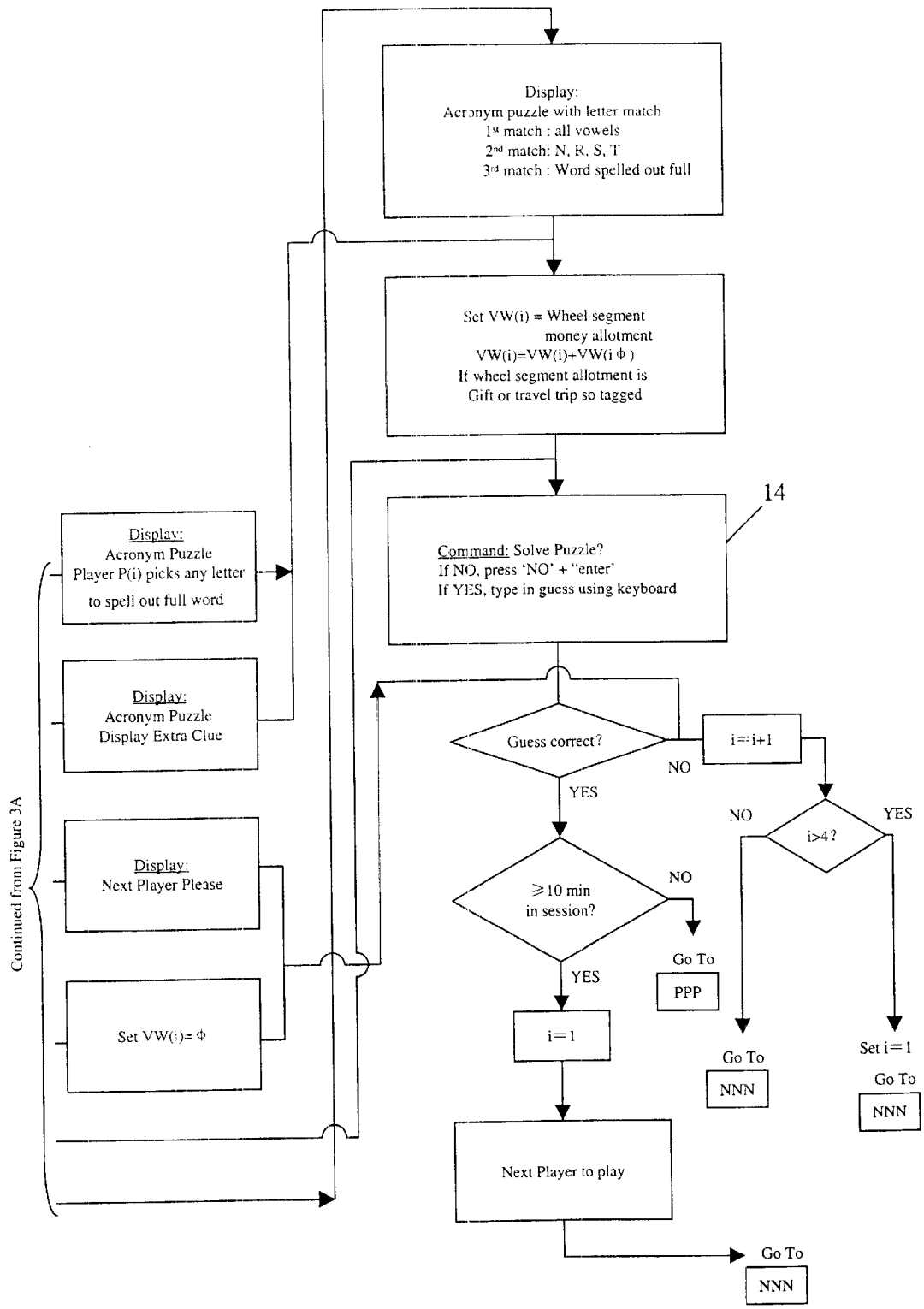

FIG. 3 shows the details of the main loop 2 sub-flow chart. After displaying the 6 pre-selected subject categories out of a collection as shown in Appendix II and asking the first player to pick the first subject category in block 11, the game apparatus displays the acronym puzzle in block 12. The game apparatus then asks the first player to start the game by spinning the game wheel in block 13. The flow of the game thereafter is described in detail by the main loop 2 sub-flow chart shown in FIG. 3. A player is always given a choice to guess at the puzzle by block 14 (see FIG. 3) every time after he spins the wheel except when the wheel lands at either "Lose a turn" or "Bankrupt" segment. In the latter case, the player forfeits all his previous monetary values earned in this particular game (but not the monetary value that he might have already accumulated earlier in the game session) and forfeits his turn of play as well.

When the game session finally ends due to time expiration, the player who has accumulated the most monetary value is declared the winner. For those players who have earned gifts or travel trips during any of the puzzle games played, those items have assigned monetary values and will be added to the earned monetary values of the players towards deciding which player is the winner of the game session.

Figure 4:
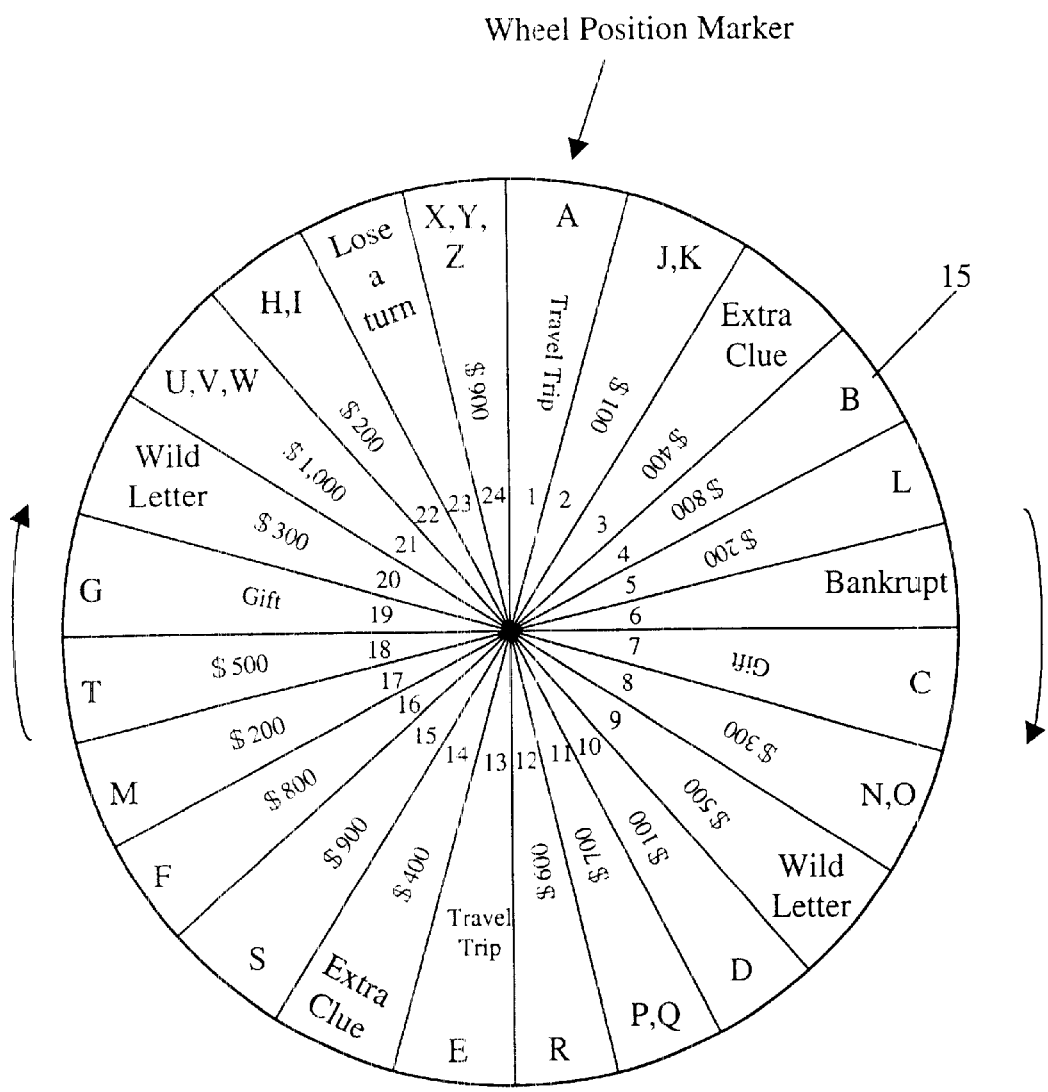
FIG. 4 shows the game wheel for the acronym puzzle game.

The Acronym Guessing Game wheel 15 is shown in FIG. 4. Note that there are a total of 24 segments in the wheel with one wheel position marker at the first segment of the wheel. The letters of the alphabet, either singly or in small groups, occupy a total of 18 segments as shown in FIG. 4 (segments 1, 2, 4, 5, 7, 8, 10, 11, 12, 13, 15, 16, 17, 18, 19, 21, 22, 24). Two segments are devoted each to "Wild Letter" and "Extra Clue" respectively (segments 9, 20, 3, 14) and one each to "Lose a turn" and "Bankrupt" respectively (segments 23, 6). With the exception of "Lose a turn" and "Bankrupt", each of the other 22 segments are labeled with a monetary value or a gift or travel trip item. For example segment 4, which carries the letter "B" has an assigned monetary value equal to $800. Similarly, segment 24 which carries the group of letters "X,Y,Z" has an assigned monetary value equal to $900. On the other hand segments 1 and 13, which carries the letter "A" and "E" respectively, carries a travel trip instead of an assigned monetary value. The same is true for segments 7 and 19 which carries the letter "C" and "G" respectively, carries a gift item in lieu of assigned monetary values.

Figure 5:
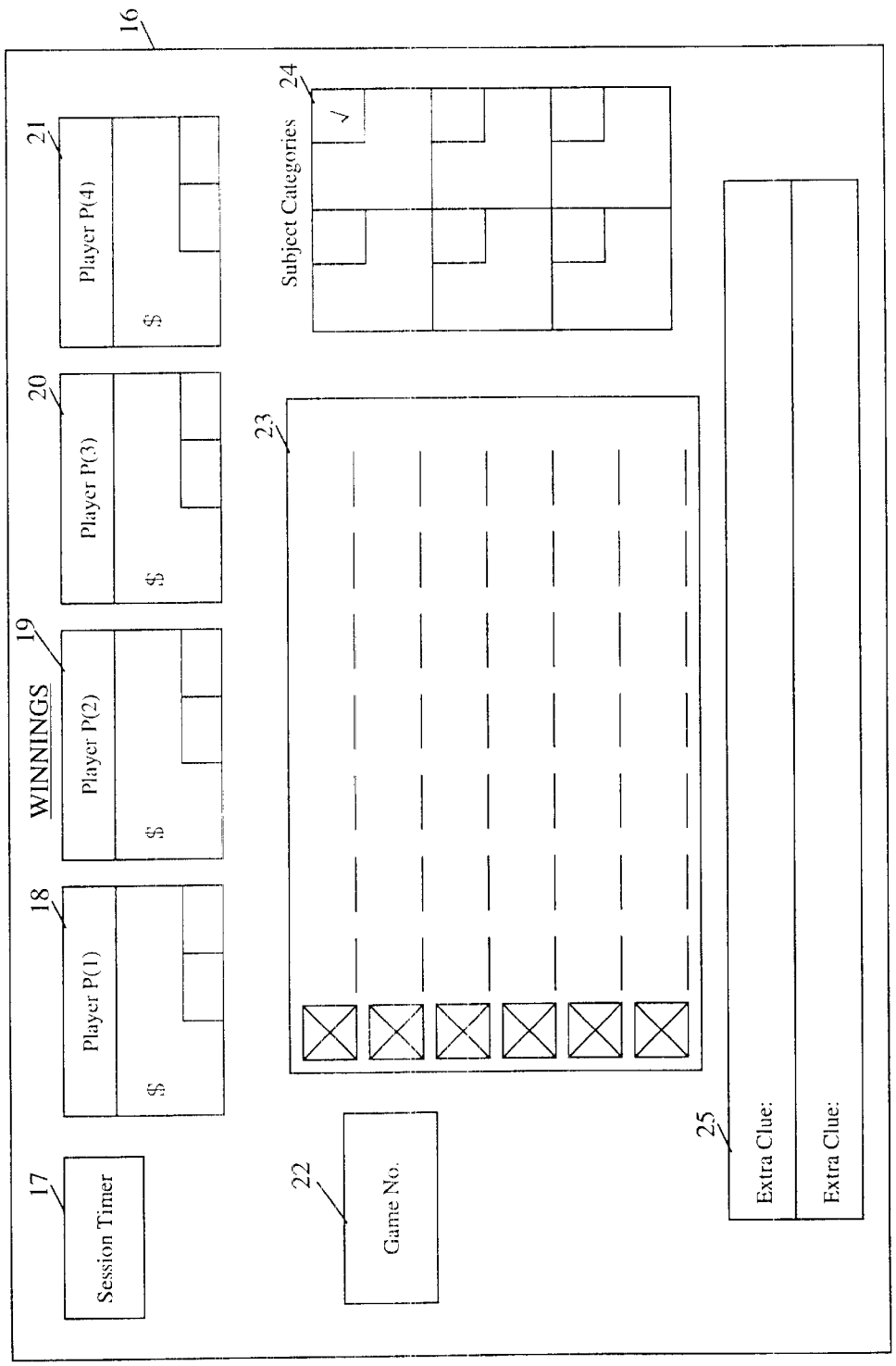
FIG. 5 shows the game apparatus status display as appearing in Liquid Crystal Display (LCD) screen.

The Acronym Guessing Game status display 16 as appearing on the LCD screen 28 of the game console (see FIG. 6 below) is shown in FIG. 5. The Session timer 17 is shown at the upper left hand corner of the display 16. The winnings of players 1–4 are shown in rectangular boxes 18–21 respectively. Box 22 displays the puzzle game number that is being played in a game session. In the center is the main acronym puzzle display 23. The subject categories (six categories) and the extra clues displays are depicted in boxes 24 and 25 respectively.

Figure 6:
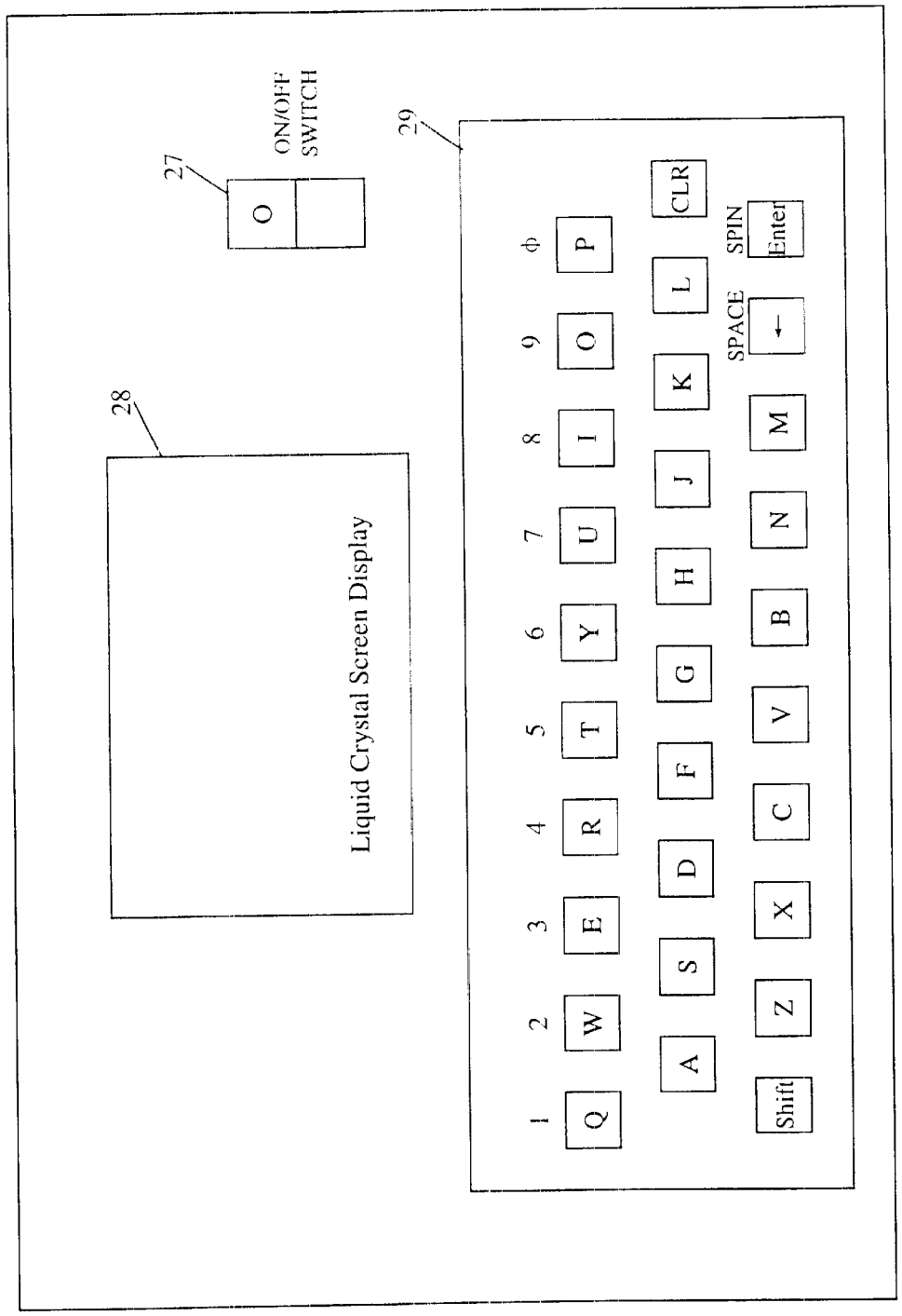
FIG. 6 shows game apparatus console.

FIG. 6 shows the Acronym Guessing Game apparatus console 26. The console 26 consists of three items. The first item is the game apparatus ON/OFF switch 27. The second item is the LCD display 28 which serves to display the status of the game while it is in progress as depicted in FIG. 5. The third item is the alphanumeric keyboard 29 which serves as the input to the game apparatus from the players. In the keyboard 29, there are the usual 26 alphabet characters.

The numbers 0–9, the "Space" and the "Spin" keys are addressed with the help of the "Shift" key. In addition to the 26 alphabetic characters, there are also the "Back Space" and "Enter" keys to facilitate entering inputs to the game apparatus. For example, a player can guess at the acronym puzzle by simply typing in the words represented by the letters of the acronym. The game apparatus then makes the decision whether the input guess is correct or otherwise.

The present electronic game of guessing acronyms can be implemented in quite a simple and straightforward manner using modern day microcomputer and microelectronic technologies. As will be described in more detail below, almost 100% of the functions for the game will be performed via stored software (permanently as Read Only Memory or ROM) in a microcomputer. The interfacing electronics, which governs the players' input to the game and the game apparatus' message or commands to the players, will also be controlled by software and hardware. The only separate and independent electronic circuits needed are those power regulation supply circuits and batteries that power the microcomputer. As far as the game display and game console are concerned, both the LCD display and the alphanumeric keyboard will be controlled also by the microcomputer. Both the inputs to the game apparatus and the output to the players from same are respectively directed to or originated from the software resident in the on-board microcomputer.

Figure 7:
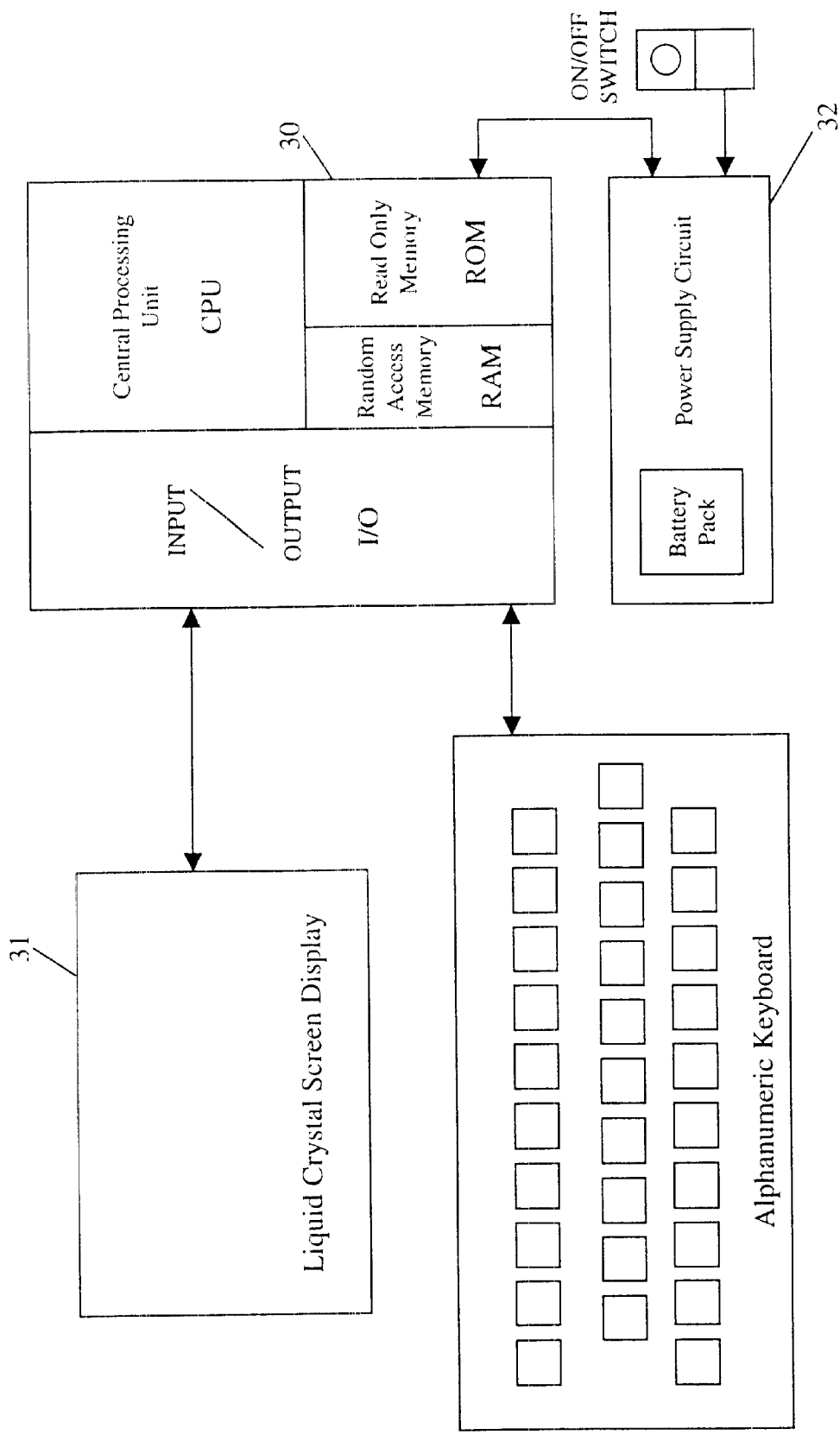
FIG. 7 shows the game apparatus system block diagram.

FIG. 7 shows the system block diagram for the game apparatus of the present invention. There are basically four (4) component building blocks for the present Acronym Guessing electronic game. They are 1) system processor 30 which takes the form of a complete microprocessor comprising a Central Processing Unit (CPU), Read Only Memory (ROM) which stores the system software, Random Access Memory or RAM and Input/Output interfaces (I/O); 2) LCD screen display 31 (part of game console) interfaced to and controlled by the system processor 30; 3) an alphanumeric keyboard (also part of game console) interfaced and controlled by the system processor 30 and 4) power supply 32 to power the system processor, LCD screen, alphanumeric keyboard and other component building blocks.

Figure 8:
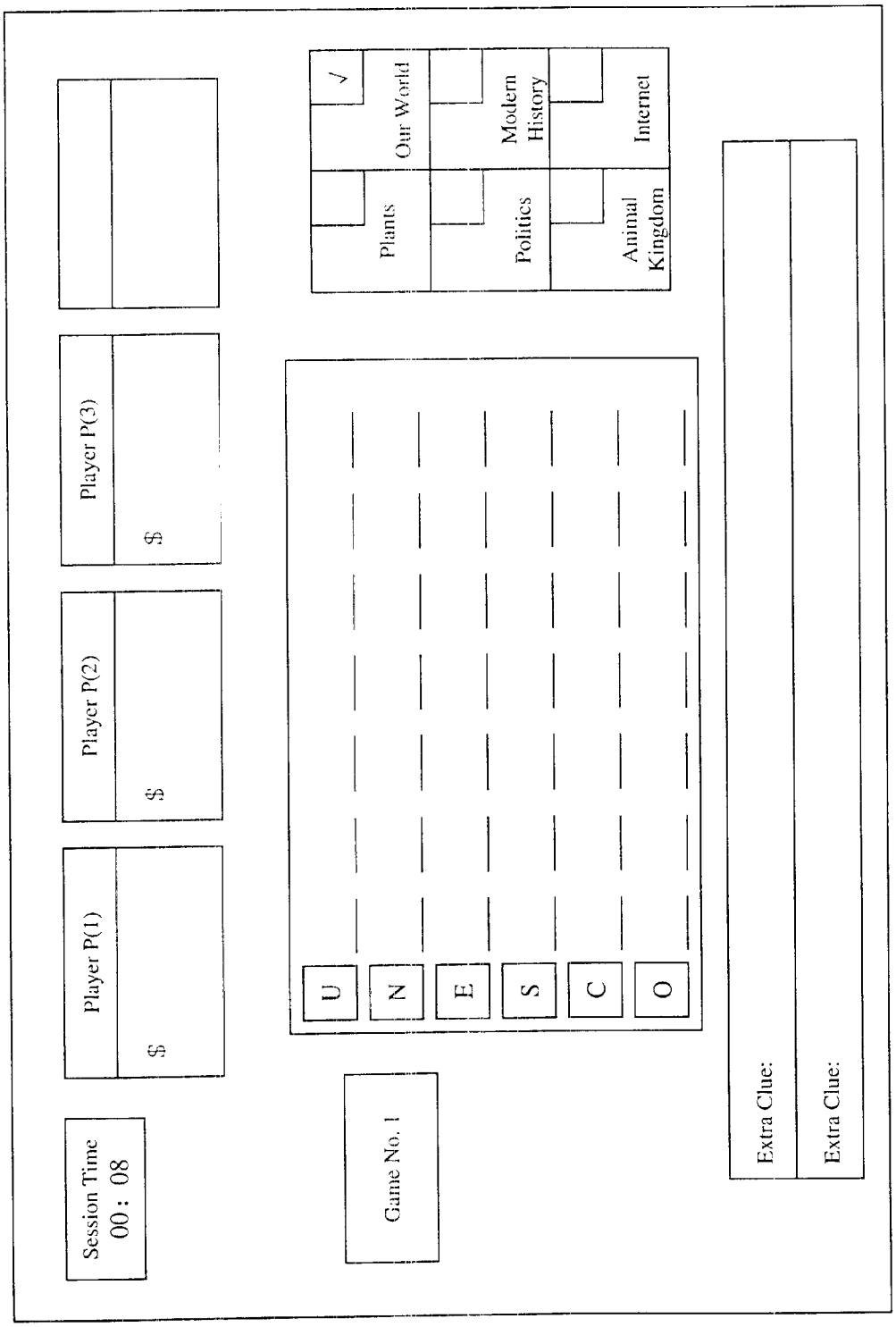
FIGS. 8–18 illustrate the sequential game status displays of the Acronym Guessing Game Apparatus as appeared in the LCD display of the game console for an actual game playing example.
Figure 9:
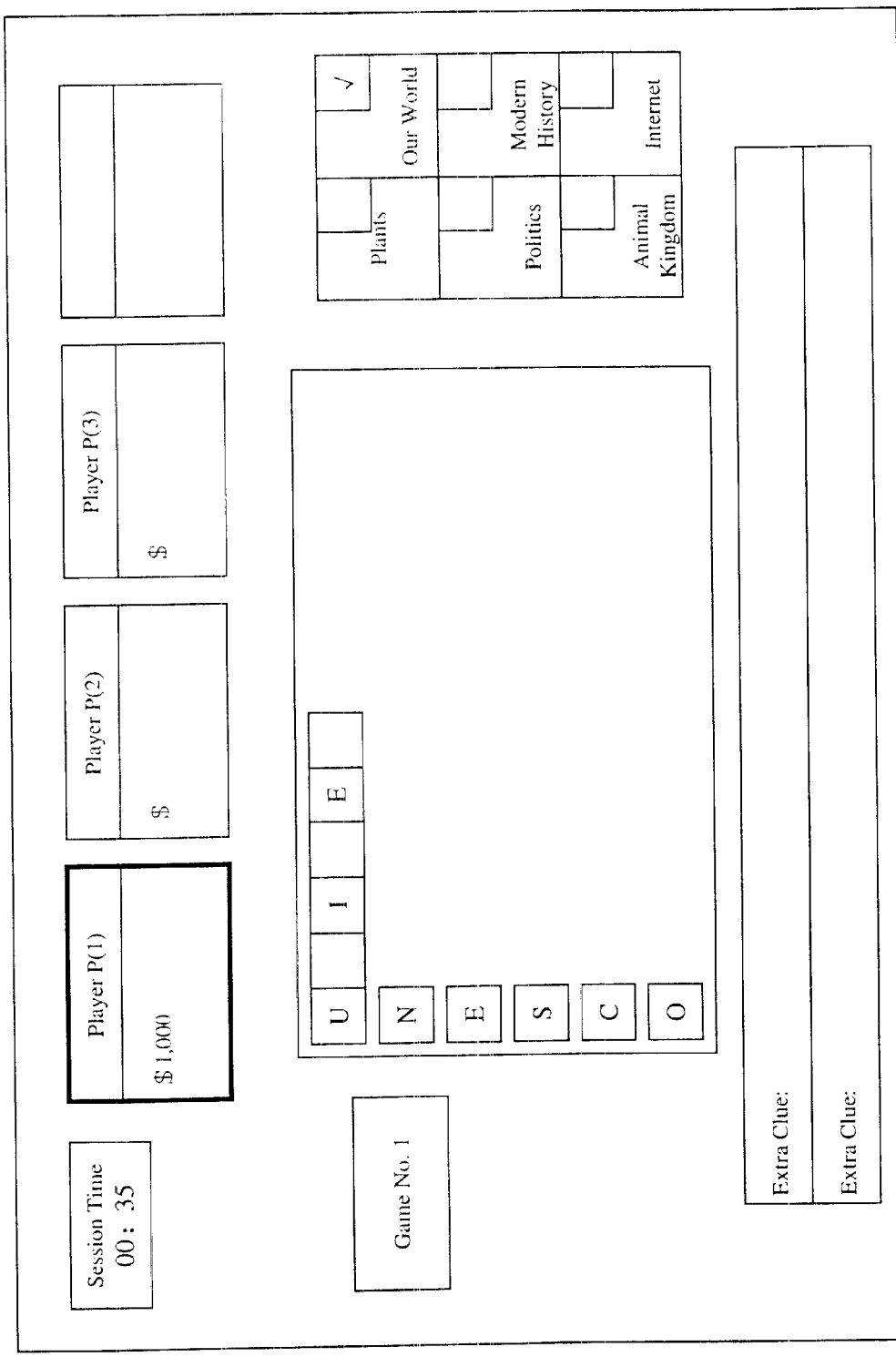
Figure 10:
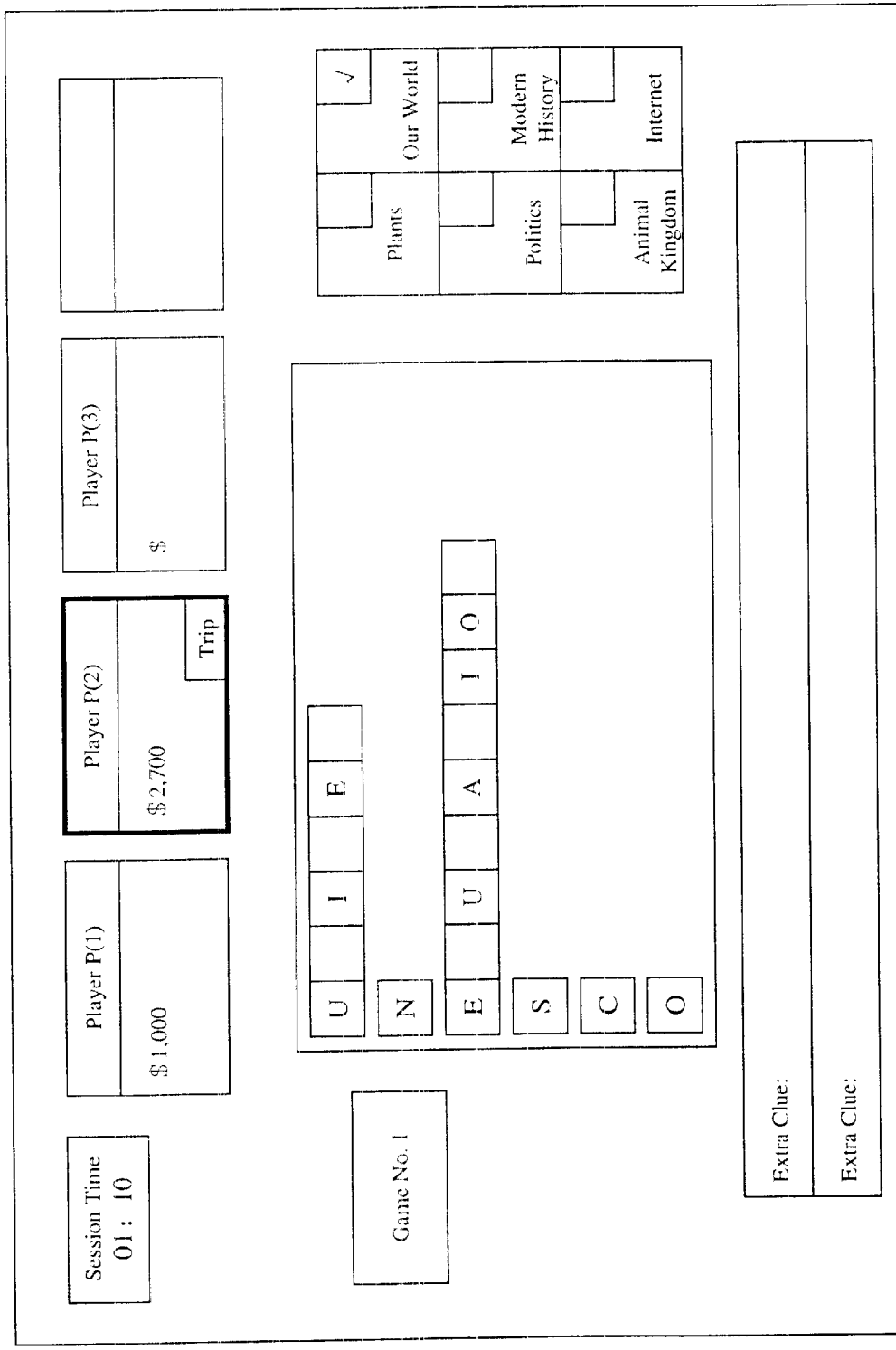
Figure 11:
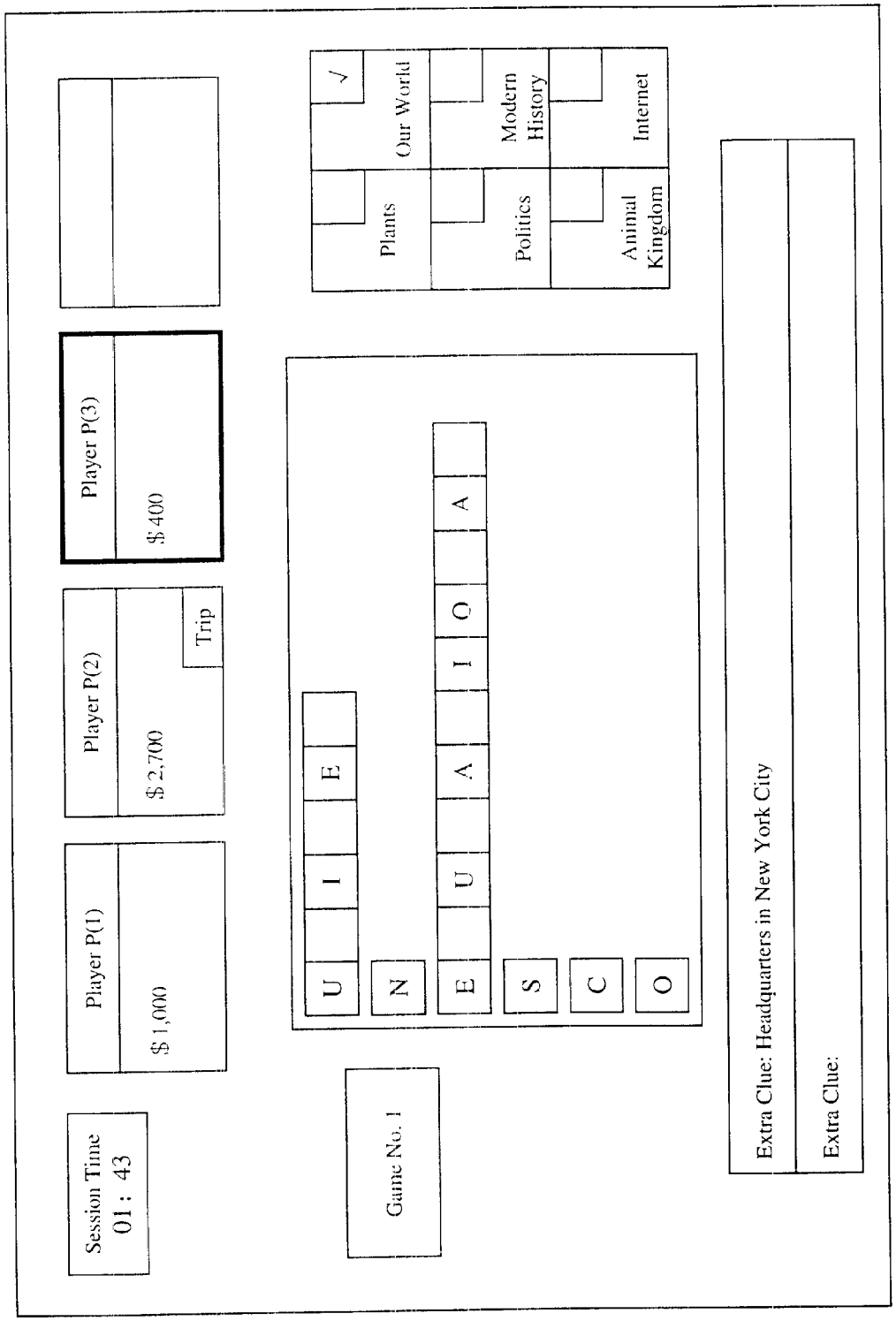
Figure 12:
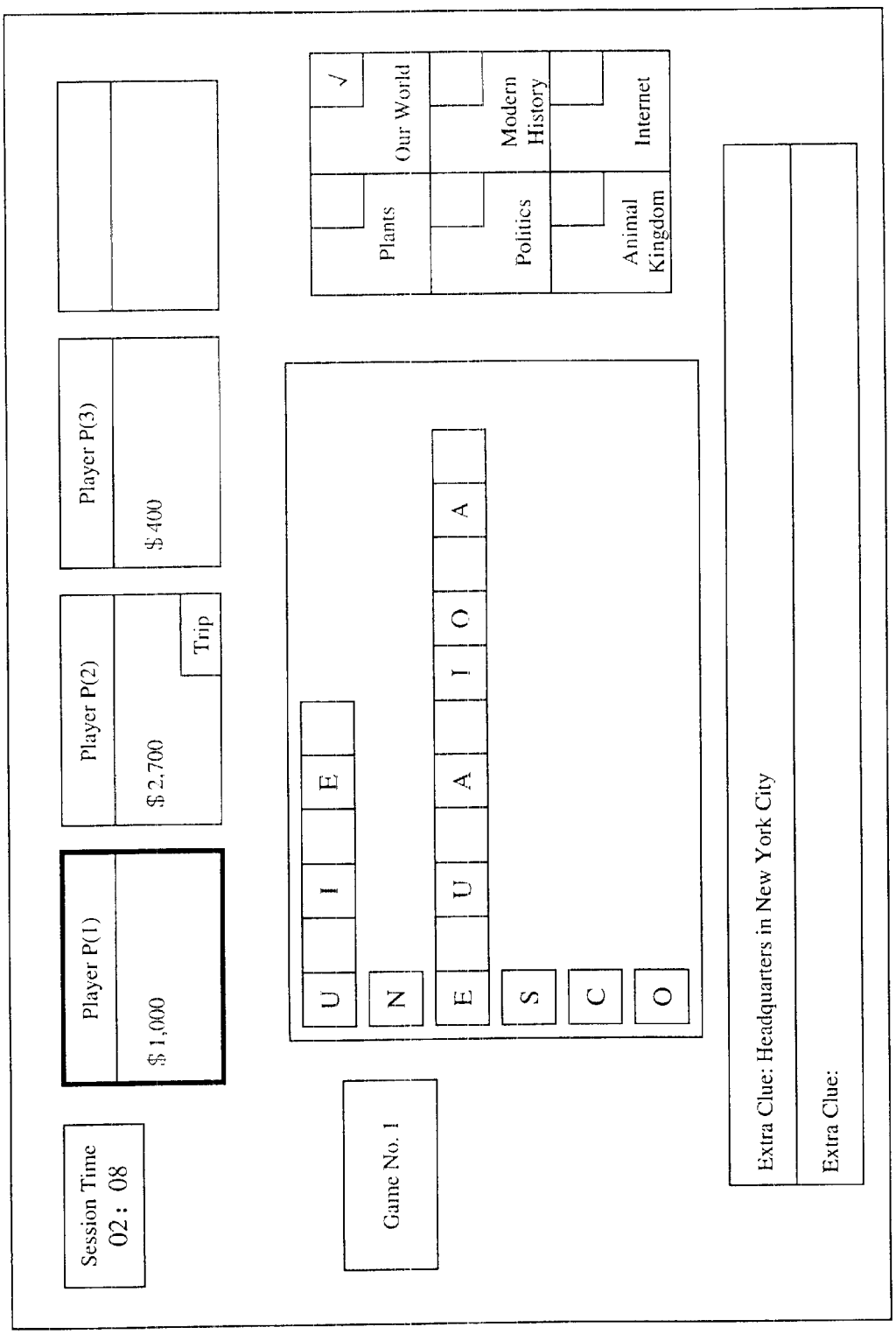
Figure 13:
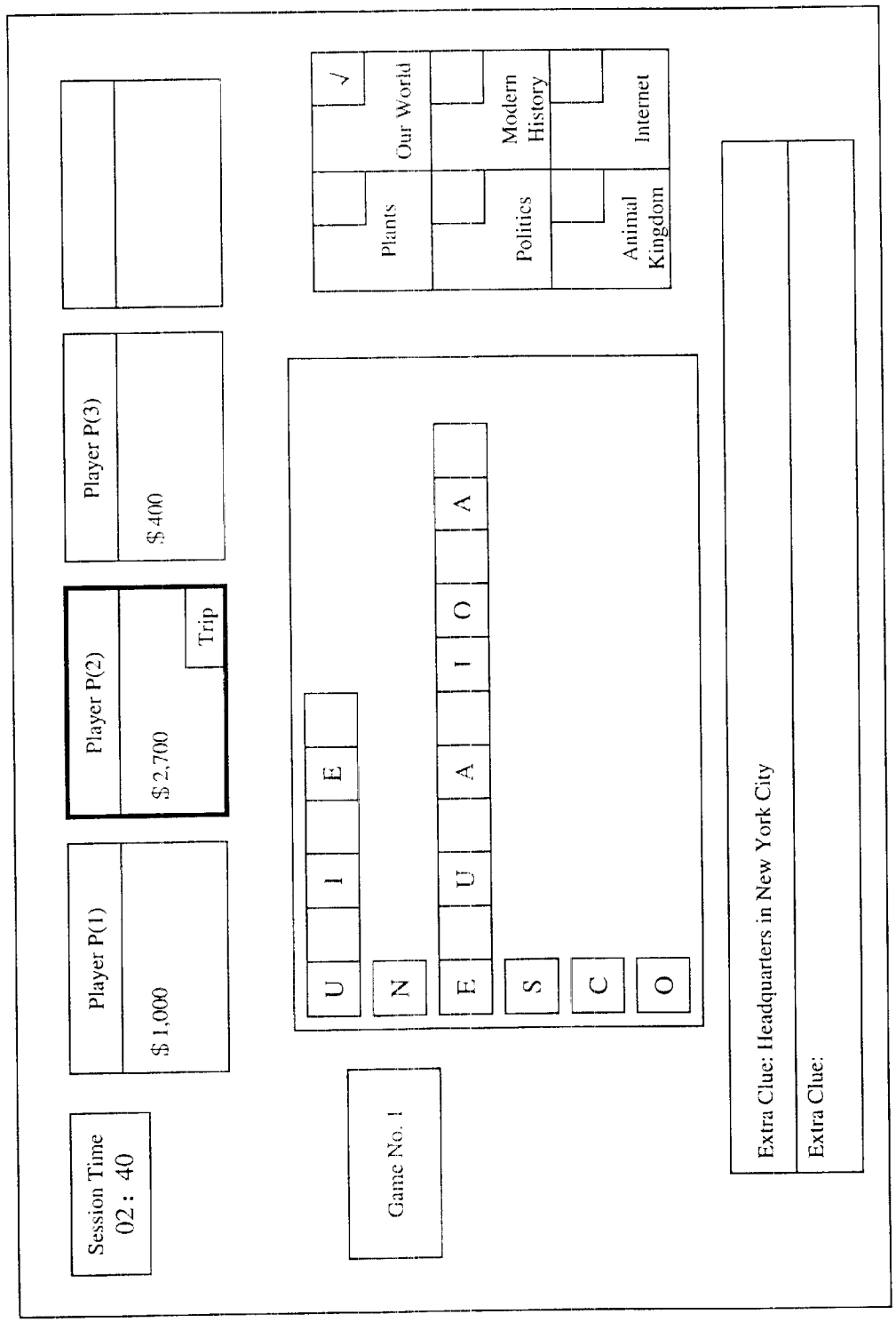
Figure 14:
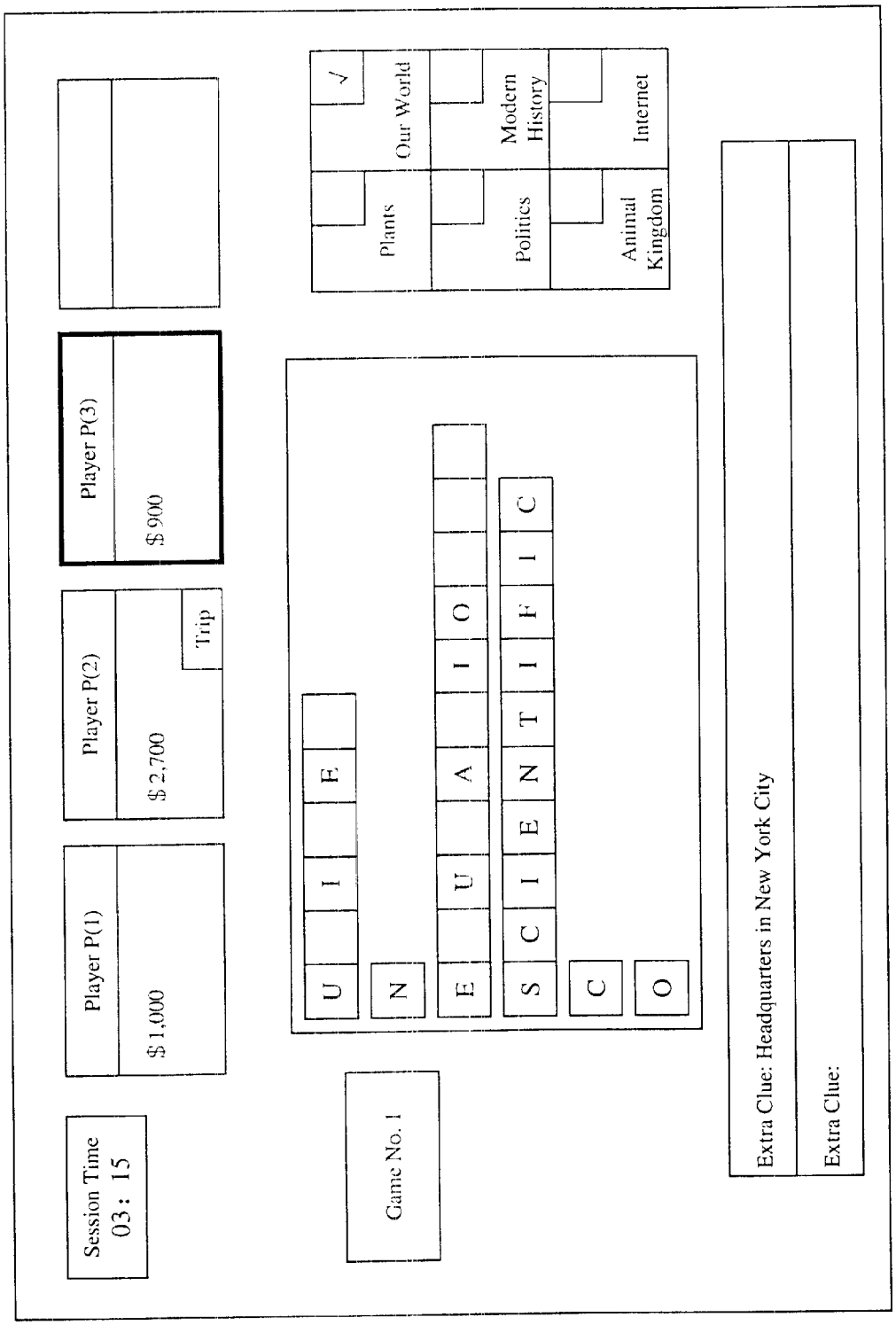

FIGS. 8 through 18 show the actual playing procedures, game console LCD displays and sequences for three players playing the acronym guessing game. As shown in FIG. 8, the subject category selected by the first player is "Our World" and the acronym puzzle presented by the game apparatus for playing is "UNESCO".

The game wheel segment positions are presented in sequence as follows:

1. Position 21 [U,V,W and $1,000] (see Game Wheel layout in FIG. 4) landed by Player P(1) [see FIG. 9]

Note that in this case there is a match in the letter "U" of the acronym puzzle. The rule is that when the first time an acronym letter is matched, all the vowels, namely A, E, I, O, U that appear in the word begun with "U" will be shown. Thus in this case in addition to Player P(1) collecting $ 1,000, the first word in the acronym puzzle starting with "U" is also shown, viz. "U_I_E_" and indicating this word is six letters long.

2. Position 13 [E and a Travel Trip] landed by Player P(2) [see FIG. 10 ]

Note that in this case there is a match in the letter "E" of the acronym puzzle. The same first time match rule applies so that the word starting out with "E" is shown as "E_U_ A_IO_A_" and indicating that this word is 11 letters long. Also the trip is worth $2,700 and is recorded in Player P(2)'s winning box.

3. Position 14 [Extra Clue and $400] landed by Player (3) [see FIG. 11]

Note that in this case an extra clue appears in the LCD display EXTRA CLUE as "Headquarters in New York City". Player P(3) also collects $400 winnings.

4. Position 23 [Lose a turn] landed by Player P(1) [see FIG. 12]

Note that in this case Player P(1) collects no winnings and forfeits a turn. Nothing has changed as far as the progress of the game is concerned.

5. Position 2 [J, K and $ 100] landed by Player P(2) [see FIG. 13]

Note that in this case there is no match of the letters J, K to those in the acronym puzzle. Player P(2) collects no winnings. Nothing has changed as far as the progress of the game is concerned.

6. Position 9 [Wild Letter and $ 500] landed by Player P(3) [see FIG. 14]

Note that in this case, the player can pick any letter in the acronym puzzle and has the word spelled out in full. Player P(3) picks the letter "S" in the puzzle and the word "SCIENTIFIC" is spelled out in full for him. He also collects $500.

7. Position 8 [N, O and $300] landed by Player P(1) [see FIG. 15]

Figure 15:
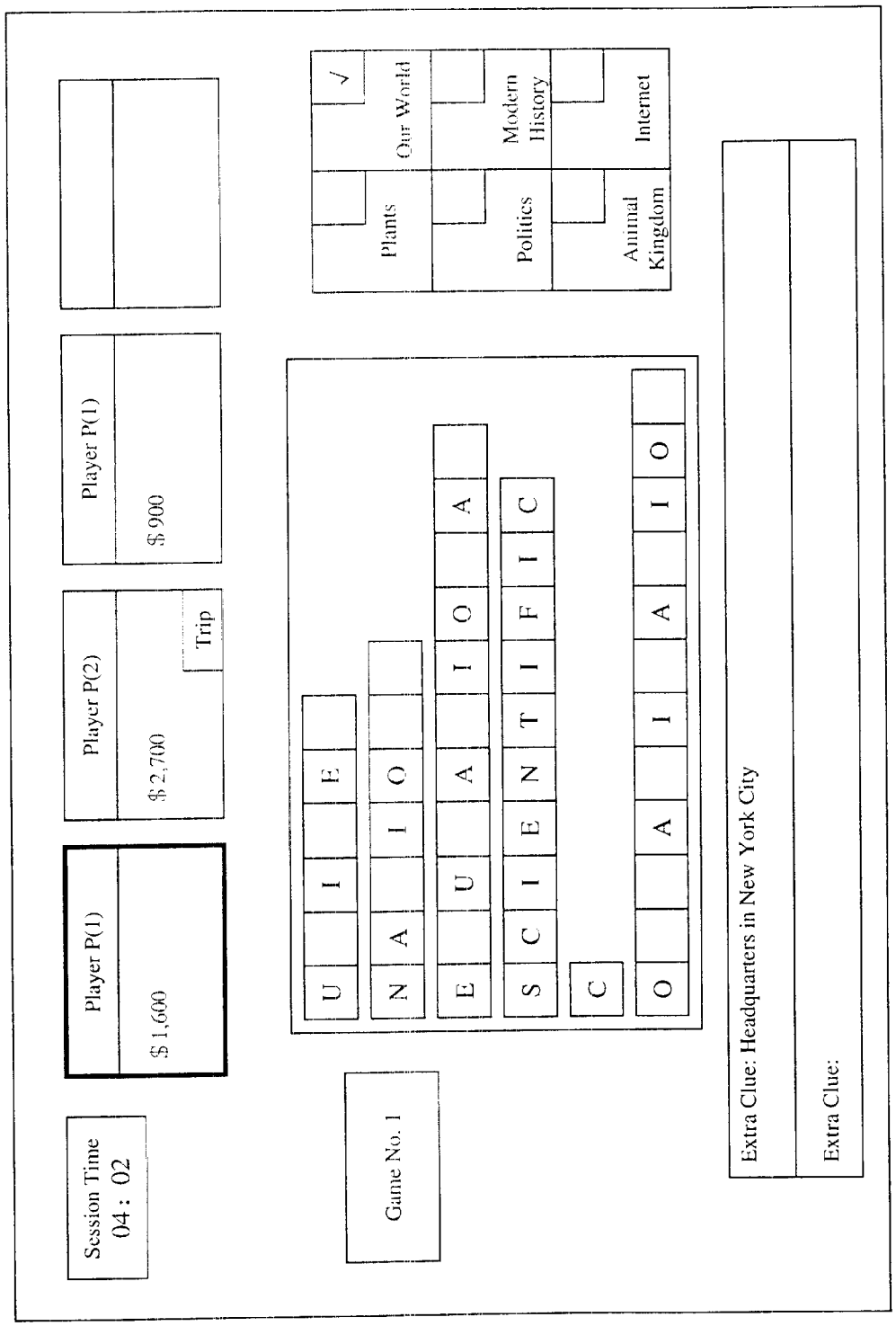
Figure 16:
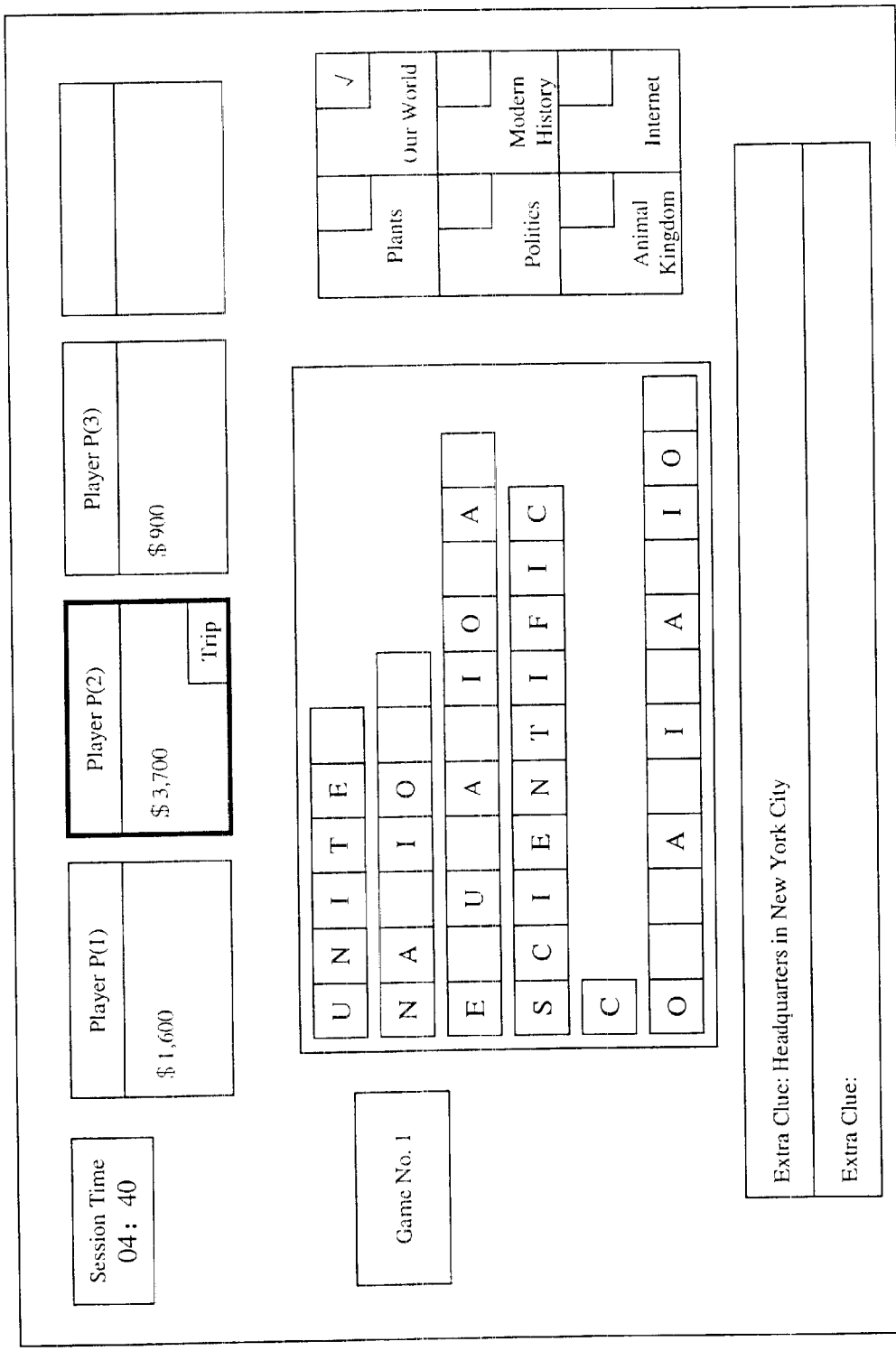
Figure 17:
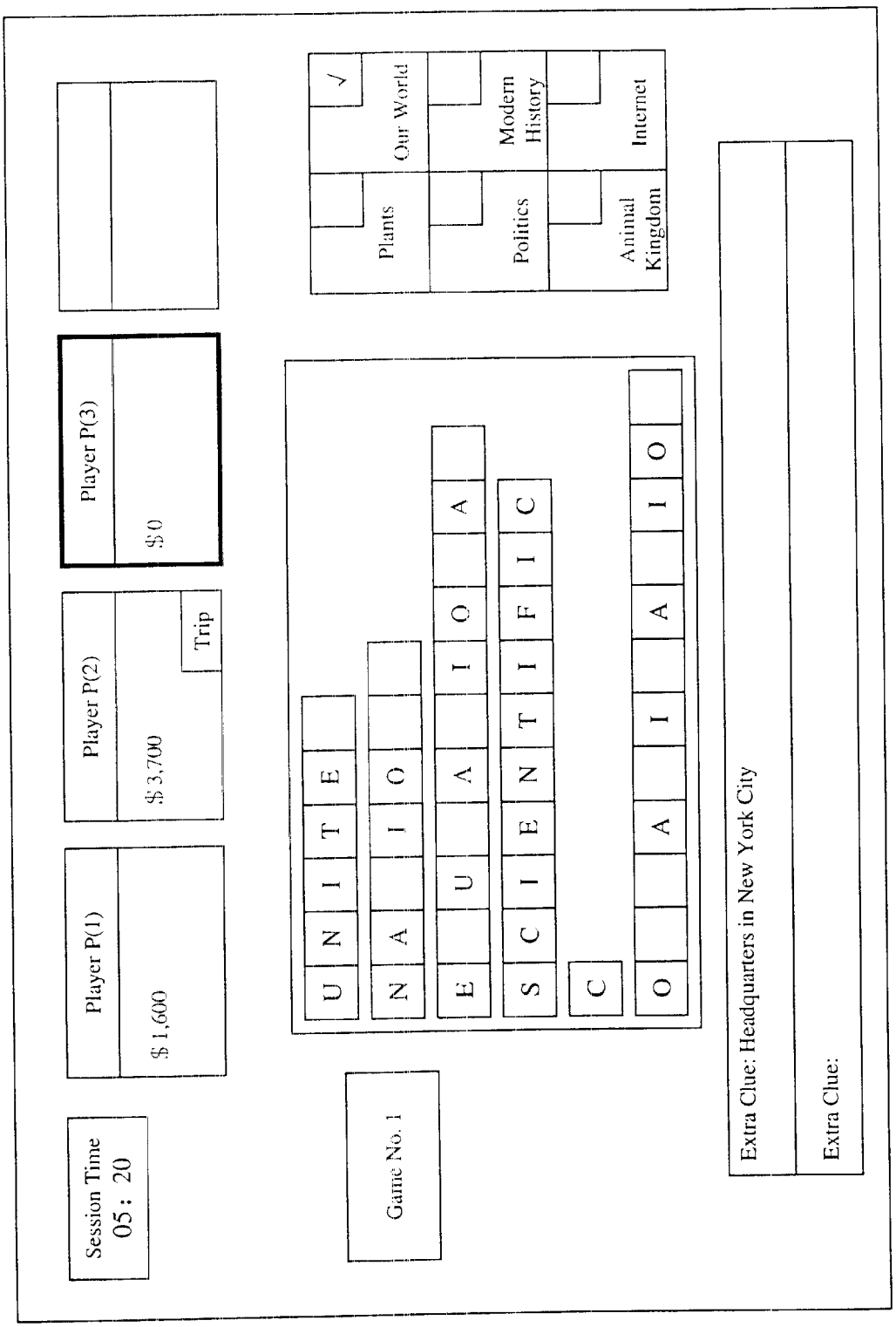
Figure 18:
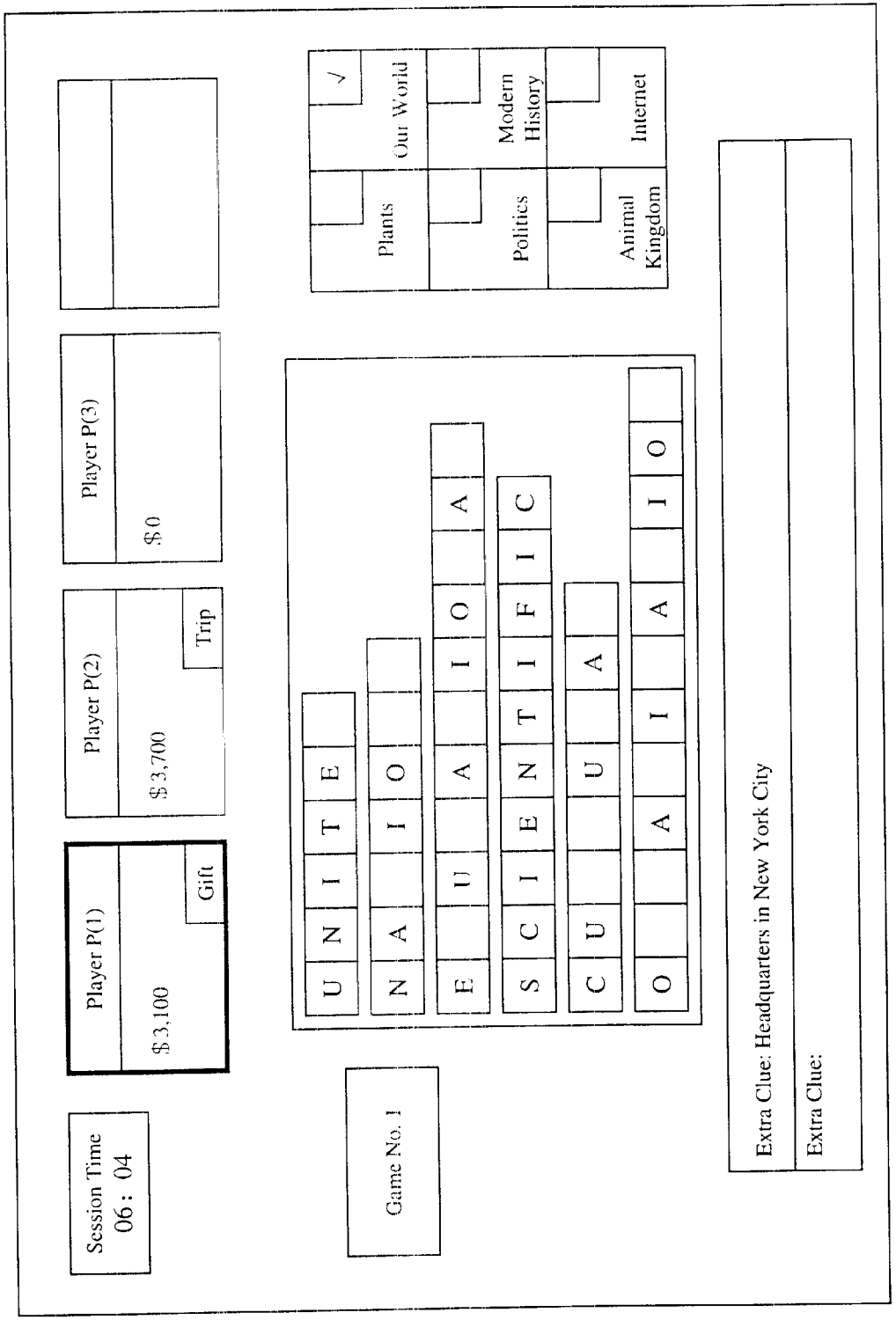

Note that in this case, both the letters "N" and "O" match with those in the acronym puzzle. Since this is the first match for both letters in the acronym puzzle, only the vowels A, E, I, O, U are revealed as shown in FIG. 15 because they are both first matches. Player P(1) also collects double the monetary allotment, viz. $600 instead of $300 because there are two matches of letters.

8. Position 21 [U,V,W and $1,000] landed by Player P(2) [see FIG. 16]

Note that in this case the letter "U" matches that of the acronym puzzle the second time. In this situation, the additional letters "L, N, R, S, T" are revealed in the word starting out with "U" in the puzzle. The first word now becomes "UNITE_". Player P(2) also collects $1,000. [Note that after three matches of the same letter in the acronym puzzle, the entire word will be spelled out in full.]

9. Position 6 [Bankrupt] landed by Player P(3) [see FIG. 17]

Note that in this case Player P(3) loses all his previous winnings and he further forfeits the turn.

10. Position 7 [C and Gift] landed by Player P(1) [see FIG. 18]

Note that in this case there is a first match of the letter "C" and the vowels are revealed in the puzzle word starting with "C", namely "CU ___U_A_". Player P(1) collects a gift which is worth $1,500 and is added to his winnings. At this point Player P(1) correctly guesses at the puzzle to be "UNITED NATIONS EDUCATIONAL SCIENTIFIC CULTURAL ORGANIZATION". This game ends and Player P(1) wins this particular game and pockets a total of $3,100 of which $1,600 is cash and a gift worth $1,500.

Since the session timer only elapses a little over 6 minutes (see FIG. 18) and there is plenty of time left for the players to start another puzzle game. A typical game session will last 30 minutes.

Thus, there has been described an Acronym Guessing electronic game, both as to organization and method of operation as preferred embodiments of the present invention. Additional variations which would be apparent to workers knowledgeable in the field, such as acronyms in other languages having an alphabet, are considered to be encompassed within the present invention, which is defined by the following claims.

APPENDIX I

Acronyms for Electronic Banking/Commerce

| Acronym | Meaning |
|---|---|
| ACH | Automated Clearinghouse |
| ACTS | Advanced Communication Technologies and Services |
| ADSL | Asymmetric Digital Subscriber Line |
| AES | Advanced Encryption Standard |
| AFCEE | Association Française pour le Commerce et les Échanges Électroniques |
| AFNOR | Association Française de Normalisation |
| AH | Authentication Header |
| AID | Application Identifier |
| AIR-IMP | AIR Interline Message Procedures |
| ANSI | American National Standards Institute |
| API | Application Programming Interface |
| ARDP | Asychronous Reliable Delivery Protocol |
| ARQC | Authorization Request Cryptogram |
| ASC | Accredited Standards Committee |
| ASN.1 | Abstract Syntax Notation 1 |
| ATM | Asynchronous Transfer Mode |
| ATM | Automated Teller Machine |
| ATR | Answer to Reset |
| BACS | Banker's Automated Clearing Service |
| BER | Basic Encoding Rules |
| BIN | Bank Identification Number |
| BIS | Bank for International Settlements |
| BISP | Bank Internet Payment System |
| BSP | Bank Settlement Payment |
| BTX | Bildschirmtext |
| CAC | Confirmation and Authentication Challenge |
| CAFE | Conditional Access for Europe |
| CALS | Computer-aided Acquisition and Logistics Support, became Continuous Acquisition and Life-cycle Support, then Commerce at Light Speed |
| CAN | Customer Account Number |
| CAPI | Cryptographic Application Programming Interface |
| CAR | Confirmation and Authentication Response |
| CARGO-IMP | CARGO Interchange Message Procedures |
| CASE | Computer-Aided Systems Engineering |
| CBC | Cipher Block Chaining |
| CCD | Cash Concentration and Disbursement |
| CCITT | Comité Consultatif International Télégraphique et Téléphonique |
| CDT | Committee for Development of Trade |
| CEFACT | Centre pour la Facilitation des Pratiques et des Procédures dans l'Administration, le Commerce, et les Transports |
| CEFIC | Conseil Européen des Fédérations de l'Industrie Chimique |
| CEI | Commission Électrotechnique Internationale |
| CEN | Comité Européen de Normalisation |
| CFB | Cipher Feedback |
| CFONB | Comité Français d'Organisation et de Normalisation Bancaire |
| CGM | Computer Graphics Metafile |
| CHAPS | Clearinghouse Automated Payment System |
| CHIPS | Clearinghouse Interbank Payment System |
| CID | Cardholder ID |
| CIDX | Chemical Industry Document Exchange |
| CIIP | Check Image Interchange Protocol |
| CMC7 | Caractères Magnétiques Codes à 7 Bâtonnets |
| CMP | Certificate Management Protocol |
| CMS | Cryptographic Message Syntax |
| COF | Common Output Format |
| COST | Computer Security Technologies |
| CPS | Certification Practice Statement |
| CPTP | Customer Payment Server Transaction Protocol |
| Creic | Centres Regionaux d'Échanges d'Images-Chèques |
| CRL | Certification Revocation List |
| C-SET | Chip-Secured Electronic Transaction |
| CSM | Chipcard Security Module |
| CTI | Computer Telephony Integration |

APPENDIX I-continued

Acronyms for Electronic Banking/Commerce

| Acronym | Meaning |
|---|---|
| CTP | Corporate Trade Payments |
| CTX | Corporate Trade Exchange |
| DAP | Directory Access Protocol |
| DEC | Digital Equipment Corporation |
| DEDICA | Directory-based EDI Certificate Access and Management |
| DER | Distinguished Encoding Rules |
| DES | Data Encryption Standard |
| DF | Dedicated File |
| DGI | Direction Génerale des Impôts |
| DIN | Deutsches Institut für Normung e.V. |
| DIR | Directory |
| DIS | Draft International Standard |
| DISA | Data Interchange Standards Association |
| DISP | Directory Information Shadowing Protocol |
| DNS | Domain Name Service |
| DOD | Department of Defense |
| DOP | Directory Operational Binding Management Protocol |
| DPA | Differential Power Analysis |
| DRAM | Dynamic Random Access Memory |
| DSA | Digital Signature Algorithm |
| DSL | Digital Subscriber Line |
| DSP | Directory System Protocol |
| DSS | Digital Signature Standard |
| DSSSL | Document Style Semantics and Specification Language |
| DTD | Document Type Definition |
| EAN | European Article Numbering Association |
| EBES | European Board for EDI Standardization |
| EBS | Elektronik Banking Systems GmBH |
| ECB | Electronic Code Book |
| ECCHO | Electronic Check Clearinghouse Organization |
| ECP | Electronic Check Presentment |
| EDE | Encryption-Decryption-Encryption |
| EDI | Electronic Data Interchange |
| EDIFACT | Electronic Data Interchange for Administration, Commerce and Transport |
| EDIINT | EDI Internet Integration |
| EEG | EBES Expert Group |
| EEPROM | Electrically Erasable Programmable Read Only Memory |
| EF | Elementary File |
| EFT | Electronic Funds Transfer |
| EFTA | European Free Trade Association |
| EID | Electronic Identity Card (in Sweden) |
| EMV | EuroPay, MasterCard, Visa |
| EPC | Every Penny Counts, Inc. |
| EPH | Electronic Payments Handler (in BIPS) |
| EPO | Electronic Payment Order |
| EPOID | Electronic Payment Order Identifier |
| EPROM | Electrically Programmable Read Only Memory |
| ESP | Encapsulating Security Payload |
| ETEBAC | Échange Télématique entre les Banques et leurs Clients |
| ETSI | European Telecommunications Standards Institute |
| EWG | EDIFACT Work Group |
| FACNET | Federal Acquisition Computer Network |
| FAQ | Frequently Asked Questions |
| FeRAM | Ferrite Random Access Memory |
| FIC | Federal Insurance Corporation |
| FSML | Financial Services Markup Language |
| FSTC | Financial Services Technology Consortium |
| FTP | File Transfer Protocol |
| GALIA | Groupement pour l'Amélioration des Liens dans l'Industrie Automobile |
| GCARI | Graphical Communications Association Research Institute |
| GDS | Goppinger Datenservice |
| Gie | Groupement d'Intérêt Économique |
| GMD | Gesellschaft für Mathematik und Datenverarbeitung |
| GMT | Greenwich Mean Time |
| GOCPKI | Government of Canada Public Key Infrastructure |
| GTDI | General-purpose Trade Data Interchange |
| HEDIC | Healthcare EDI Coalition |
| HIBCC | Health Industry Business Communications Council |
| HMAC | Hashed Message Authentication Code |

APPENDIX I-continued

Acronyms for Electronic Banking/Commerce

| | |
|---|---|
| HTML | HyperText Markup Language |
| HTTP | HyperText Transfer Protocol |
| HyTime | Hypermedia/Time-based Document Structuring Language |
| IAD | Issuer Authentication Data |
| IADF | Internal Application Data File |
| IANA | Internet Assigned Numbers Authority |
| IATA | International Air Transport Association |
| IBA | Italian Banking Association |
| IDEA | International Data Encryption Algorithm |
| IEC | International Electrotechnical Commission |
| IETF | Internet Engineering Task Force |
| IETM | Interactive Electronic Technical Manuals |
| IFTM | International Forwarding and Transport Message |
| IMAP | Internet Message Access Protocol |
| INRIA | Institut National de Recherche en Informatique et en Automatique |
| InterNIC | Internet Network Information Center |
| IP | Internet Protocol |
| IPSEC | Internet Protocol Security |
| IRC | Internet Relay Chat |
| ISAKMP | Internet Security Association and Key Management Protocol |
| ISDN | Integrated Services Digital Network |
| ISI | IBM Smartcard Identification (protocol) |
| ISI | Information Science Institute |
| ISO | International Standardization Organization |
| ITAR | International Traffic in Arms Regulation |
| ITU | International Telecommunication Union |
| ITU-T | International Telecommunication Union-Telecommunications Standardization Sector |
| JEPI | Joint Electronic Payment Initiative |
| JPEG | Joint Photographic Expert Group |
| JRT | Joint Rapporteurs Team |
| KEA | Key Exchange Algorithm |
| LACES | London Airport Cargo EDP Scheme |
| LDAP | X.500 Lightweight Directory Access Protocol |
| LETS | Local Exchange Trading System |
| LVMH | Louis Vuitton-Moët-Hennesy |
| MAC | Message Authentication Code |
| MD | Message Digest |
| MDG | Message Development Group |
| MF | Master File |
| MFC | Multifunction Card |
| MIC | Message Integrity Check |
| MICR | Magnetic Ink Character Recognition |
| MIME | Multipurpose Internet Mail Extensions |
| MISPC | Minimum Interoperability Specification for PKI Components |
| MIT | Massachusetts Institute of Technology |
| MTA | Message Transfer Agent (X.400 Messaging) |
| NACHA | National Automated Clearinghouse Association |
| NASP | National Association of State Purchasing Officials |
| NatWest | National Westminster Bank |
| NC | Network Computer |
| NFS | Network File System |
| NIST | National Institute of Standards and Technology |
| NMAC | Nested Message Authentication Code |
| NMDS | Narrowband Multiservice Delivery System |
| NNTP | Network News Transfer Protocol |
| NPP | Network Payment Protocol |
| NSA | National Security Agency |
| NVM | Nonvolatile Memory |
| NWDA | National Wholesale Druggists Association |
| OAEP | Optimal Asymmetric Encryption Padding |
| OBI | Open Buying on the Internet |
| OCF | Open Card Framework |
| ODA | Open Document Architecture |
| ODETTE | Organisation des Données Échangées par Télétransmission en Europe; Organization for Data Exchange and Tele-Transmission in Europe |
| OECD | Organization for Economic Cooperation and Development |
| OFB | Output Feedback |
| OFTP | ODETTE File Transfer Protocol |
| OFX | Open Finance Exchange |

APPENDIX I-continued

Acronyms for Electronic Banking/Commerce

| | |
|---|---|
| OI | Order Information |
| OSI | Open System Interconnection |
| OTP | Open Trading Protocol |
| PACES | Paperless Automated Check Exchange and Settlement |
| PACK | Personal Authentication and Confirmation Kit |
| PAN | Primary Account Number |
| PC | Personal Computer |
| PEDI | Protocol EDI |
| PEP | Protocol Extension Protocol |
| PESIT | Protocole de Transfert de Fichier pour le Système Interbancaire de Télécompensation |
| PGP | Pretty Good Privacy |
| PI | Payment Instructions |
| PICS | Platform for Internet Content Selection |
| PIN | Personal Identification Number |
| PKCS | Public Key Cryptography Standards |
| PKIX | Public Key Infrastructure |
| PKP | Public Key Partners |
| POP | Post Office Protocol |
| POST | Point-of-Sale Terminal |
| PPP | Point-to-Point Protocol |
| PPT | Payment Proof Ticket |
| PROM | Programmable Read Only Memory |
| PRT | Payment Request Ticket |
| PST | Portable Secure Terminal |
| PSTN | Public Switched Telephone Network |
| RA | Root Authority |
| RADSL | Rate Adaptive Digital Subscriber Line |
| RAM | Random Access Memory |
| RCP | Reference Control Parameter |
| RFC | Request for Comment |
| ROM | Read-Only Memory |
| RRES | Réseaux Réciproques d'Échange de Savoirs |
| RSADSI | RSA Data Security, Inc. |
| RTC | Réseau Téléphonique Commuté |
| RTGS | Real-Time Gross Settlement |
| RTP | Real-Time Protocol |
| S/MIME | Secure MIME |
| S/WAN | Secure Wide Area Network |
| SACK | Server Authentication and Certification Kit |
| SAIC | Science Applications International Corporation |
| SAM | Security Application Module |
| SAP | Systems, Applications, Products |
| SCSSI | Service Central pour la Sécurité des Systèmes d'Information |
| SDML | Signed Document Markup Language |
| SDSI | Simple Distributed Security Infrastructure |
| SEIS | Secured Electronic Information in Society |
| SEL | Systèmes d'Échanges Locaux |
| SEMPER | Secure Electronic Marketplace for Europe |
| SET | Secure Electronic Transaction |
| SET SCCA | SET Compliance Certification Authority |
| SETREF | SET Reference Implementations |
| SGML | Standard Generalized Markup Language |
| S-HTTP | Secure HyperText Transfer Protocol |
| SHA | Secure Hash Algorithm |
| SIC | Swiss Interbank Clearing |
| SIMPROFRANCE | Comité Français pour la Simplification des Procédures du Commerce Internationale |
| SIT | Système Interbancaire de Télécompensation |
| SITA | Société Internationale de Télécommunications Aéronautiques |
| SITPRO | Simplification of International Trade Procedures |
| SKIP | Simple Key Management for Internet Protocols |
| SMTP | Simple Mail Transfer Protocol |
| SNMP | Simple Network Management Protocol |
| SNNTP | Secure Network News Transfer Protocol |
| SPKI | Simple Public Key Infrastructure |
| SRAM | Static Random Access Memory |
| SSB | Società per i Servizi Banacari |
| SSL | Secure Sockets Layer |
| SWIFT | Society of Worldwide Interbank Financial Telecommunication |
| TC | Transaction Certificate |
| TCP | Transmission Control Protocol |
| TD | Transaction Data |

APPENDIX 1-continued

Acronyms for Electronic Banking/Commerce

| | |
|---|---|
| TDCC | Transportation Data Coordinating Committee |
| TDFC | Transfert de Données Fiscales et Comptables |
| TDI | Trade Data Interchange |
| TEDIS | Trade Electronic Data Interchange System |
| TEK | Token Encryption Key |
| TEP | Terminal for Electronic Payment |
| Tep | Titre Électronique de Paiement |
| TID | Transaction ID |
| Tip | Titre Interbancaire de Paiement |
| TLS | Transport Layer Security |
| TMF | Transaction File Manager |
| TTC | Terminal Transaction Counter |
| UCS | Uniform Communication Standards |
| UDEF | Universal Data Element Framework |
| UDP | User Datagram Protocol |
| UN/ECE | United Nations Economic Commission for Europe |
| UNCID | United Nations Rules of Conduct for Interchange of Trade Data by Teletransmission |
| UNCITRAL | United Nations Commission on International Trade Law |
| UNCL | United Nations Code List |
| UN-JEDI | United Nations - Joint Electronic Data Interchange |
| UN-TDI | United Nations - Trade Data Interchange |
| UNI | User Network Interface |
| UPP | Universal Payment Preamble |
| URL | Uniform Resource Locator |
| USC | University of Southern California |
| VDSL | Very high bit rate Digital Subscriber Line |
| W3C | World Wide Web Consortium |
| WAN | Wide Area Network |
| WAP | Wireless Application Protocol |
| WEEB | West European EDIFACT Board |
| WINS | Warehouse Information Network Standard |
| WOIP | World Organization for Intellectual Property |
| WTLS | Wireless TLS |
| XML | Extensible Markup Language |
| XOR | Exclusive OR |
| ZKA | Zentraler Kreditausschuβ |

APPENDIX 2

Subject Categories

Adventure
Aeronautics
Ancient History
Animal Kingdom
Archaeology
Architecture
Art World
Artificial Intelligence
Astronomy
Attorneys
Automation
Aviation
Banking/Commerce
Biology
Building/Construction
Chemistry
Children
Civil Engineering
Computer
Cosmos
Cult/Taboo
Culture
Daily Living
Diseases
Economy
Education
Electronics
Entertainment
Environments
Fantasies
Fashion

APPENDIX 2-continued

Subject Categories

Food Industry
Genetics
Geography
Government
Humanities
Insect World
Internet
Law Enforcement
Libraries & Books
Literature
Machinery
Magic
Mathematics
Medical Instruments
Medicine
Microelectronics
Microorganism
Modern History
Movies/Cinema
Museums
Music
Natural Sciences
Nature
Neurology
News Media
Nuclear Science
Nutrition
Oceanics
Optics
Our World
Pentagon
Pharmaceuticals
Philosophy
Photography
Physics
Physiology
Plantology
Politics
Pollution Control
Psychology
Radiology
Railroads
Real Estate
Religion
Robotics
Space Sciences
Sports & Games
Stock Market
Telecommunications
Tourism
Trade/Commerce
Transportation
Universe/Cosmology
Wireless Telephony
World Wide Web
Zoology

What is claimed is:

1. An electronic game apparatus for a game of guessing English acronyms, the apparatus comprising:

a system processor; and a game console that includes an alphanumeric keyboard to interface with and input commands to the system processor, a display interface with and controlled by the system processor to display status information about the game, and an ON/OFF switch, wherein the system processor includes a central processing unit, a read only memory for storing system software for permitting game players to play the game, including making acronym guesses, a random access memory, and an input/output interface, wherein the system software includes a start loop module for setting playing chances and a players' turn for each player, and a main loop module for displaying a subject category for an acronym to be guessed, an acronym puzzle that includes the acronym and a game wheel having segments, and for permitting the players to guess the meaning of the acronym based on the word spellings relative to each letter in the acronym puzzle and related prompt information which are set and displayed at each segment on the game wheel.

2. The electronic game apparatus as set forth in claim 1, wherein the game wheel is divided into 24 segments, with 18 segments being occupied by the alphabet letters either singly or in small groups, two segments being occupied by "Wild Letter", two segments being occupied by "Extra Clue", one segment being occupied by "Loss a Turn", and one segment being occupied by "Bankrupt".

3. The electronic game apparatus as set forth in claim 1, wherein the display is a liquid crystal display.

4. The electronic game apparatus as set forth in claim 3, wherein the liquid crystal display is divided into a session timer area, a player's wining record area, an acronym puzzle display area, a subject category display area, an extra clue display area and a game number display area.

5. The electronic game apparatus as set forth in claim 1, wherein the alphanumeric keyboard comprises 26 English alphabet character keys, a "Shift" key, a "Back Space" key, an "Enter" key, with some of the keys also serving as number keys for the numbers 0~9, a "Space" key, and a "Spin" key the help of the "Shift" key.

6. A method for guessing the meaning of the English acronyms, comprising the steps of:

providing a keyboard and a display device;

inputting the number of game players and a game session period using the keyboard;

setting and displaying playing chances and turns for each player;

displaying subject categories of English acronyms to be guessed, and selecting one category among them by one of the players;

displaying a English acronym puzzle which presents an acronym to be guessed;

pressing a "Spin" key on the keyboard by each player in turn, and spinning a game wheel displayed on the display device in response to the "Spin" key, spinning a game wheel displayed on the display device in response to the pressing of the "Spin key," the game wheel having a plurality of segments, including letter segments, an "Extra clue" segment, and a "Lose a Turn" segment, wherein a plurality of the segments have monetary values, at least one of the segments indicates a gift, and at least one of the segments indicates a travel trip, when the wheel lands on the "Wild Letter" segment, a clue related to the acronym puzzle will be displayed with the corresponding monetary value or gift or travel trip for the respective player, when the wheel lands on the "Extra clue" segment, a clue related to the acronym puzzle will be displayed with the corresponding monetary value or gift or travel trip for the respective player, when the wheel lands on "Lose a Turn" segment, then it will be the next player's turn to play, and the respective player will forfeit his or her corresponding monetary values or gifts or travel trips accumulated previously, when the wheel lands on a letter segment that provides a match with one or more letters in the acronym for the first time, all vowels appearing in one or more corresponding words in the acronym will be displayed with an associated monetary value or gift or travel trip for the respective player, and further, when letters in the acronym are matched a second time, the letters N, R, S and T in the word or words will be displayed along with accumulated monetary values or gifts or travel trips for the respective player, and moreover, when the letters in the acronym are matched a third time, the word or words fully spelled out will be displayed along with accumulated monetary values or gifts or travel trips for the respective player, and when any one of the game players guesses the meaning of the acronym correctly, such player will be declared as the winner.

7. The method as set forth in claim 6, wherein, there are 6 subject categories involved in one session period, and the number of the players is four or less.

* * * * *